(12) United States Patent
Parulkar

(10) Patent No.: US 10,244,422 B2
(45) Date of Patent: Mar. 26, 2019

(54) SYSTEM AND METHOD TO MANAGE NETWORK UTILIZATION ACCORDING TO WIRELESS BACKHAUL AND RADIO ACCESS NETWORK CONDITIONS

(71) Applicant: CISCO TECHNOLOGY, INC., San Jose, CA (US)

(72) Inventor: Ishwardutt Parulkar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 14/801,381

(22) Filed: Jul. 16, 2015

(65) Prior Publication Data

US 2017/0019811 A1 Jan. 19, 2017

(51) Int. Cl.
*H04L 12/911* (2013.01)
*H04W 28/02* (2009.01)
(Continued)

(52) U.S. Cl.
CPC ..... *H04W 28/0247* (2013.01); *H04L 41/0654* (2013.01); *H04L 43/0882* (2013.01); *H04L 47/12* (2013.01); *H04L 47/22* (2013.01); *H04L 47/726* (2013.01); *H04W 24/08* (2013.01); *H04W 28/08* (2013.01); *H04W 72/12* (2013.01); *H04L 47/125* (2013.01); *H04W 88/02* (2013.01);
(Continued)

(58) Field of Classification Search
CPC . H04L 47/22; H04L 12/2439; H04L 41/0896; H04L 43/0882; H04L 41/0654; H04L 47/125; H04L 47/726; H04W 28/08; H04N 21/26216
See application file for complete search history.

(56) References Cited

U.S. PATENT DOCUMENTS 6,141,565 A 10/2000 Feuerstein et al.
6,771,934 B2 8/2004 Demers
(Continued)

FOREIGN PATENT DOCUMENTS

CN 102196581 A 9/2011
CN 103120009 A 5/2013
(Continued)

OTHER PUBLICATIONS

EPO Oct. 24, 2016 Extended Search Report and Written Opinion of the International Searching Authority from European Application No. 16178746.
(Continued)

*Primary Examiner* — Salvador E Rivas
(74) *Attorney, Agent, or Firm* — Patterson + Sheridan, LLP

(57) ABSTRACT

An example method is provided in one example embodiment and may include monitoring a plurality of wireless backhaul links associated with a radio access network (RAN); receiving an indication of a change in operating conditions for a first wireless backhaul link of the plurality of wireless backhaul links; determining utilization of the first wireless backhaul link based on the indication of the change in operating conditions; assessing an available capacity of each of the plurality of wireless backhaul links; and adjusting cellular loading in the RAN based, at least in part, on the utilization of the first wireless backhaul link and the available capacity of each of the plurality of wireless backhaul links.

20 Claims, 9 Drawing Sheets

(51) Int. Cl.

| | | |
|---|---|---|
| *H04L 12/815* | (2013.01) | |
| *H04L 12/24* | (2006.01) | |
| *H04L 12/26* | (2006.01) | |
| *H04W 28/08* | (2009.01) | |
| *H04L 12/801* | (2013.01) | |
| *H04W 24/08* | (2009.01) | |
| *H04W 72/12* | (2009.01) | |
| *H04L 12/803* | (2013.01) | |
| *H04W 88/02* | (2009.01) | |
| *H04W 88/08* | (2009.01) | |
| *H04W 88/12* | (2009.01) | |
| *H04W 88/18* | (2009.01) | |

(52) U.S. Cl.
CPC ............ *H04W 88/08* (2013.01); *H04W 88/12* (2013.01); *H04W 88/18* (2013.01)

(56) References Cited

U.S. PATENT DOCUMENTS

| | | |
|---|---|---|
| 7,151,937 B2 | 12/2006 | Jin et al. |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,107,950 B2 | 1/2012 | Amerijoo et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,219,816 B2 | 12/2015 | Grayson |
| 9,510,237 B2 | 11/2016 | Nuss et al. |
| 2004/0085909 A1 | 5/2004 | Soliman |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2010/0317351 A1 | 12/2010 | Gerstenberger |
| 2011/0039539 A1 | 2/2011 | Wada et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0201277 A1 | 4/2011 | Eguchi |
| 2011/0110316 A1 | 5/2011 | Chen et al. |
| 2011/0128862 A1 | 6/2011 | Kallin |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0195730 A1 | 8/2011 | Chami |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marisco |
| 2012/0129537 A1 | 5/2012 | Liu et al. |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0235774 A1 | 9/2012 | Guey et al. |
| 2012/0238263 A1 | 9/2012 | Caretti et al. |
| 2012/0243461 A1 | 9/2012 | Bucknell |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0070743 A1* | 3/2013 | Picker .............. H04W 28/0247 370/338 |
| 2013/0077482 A1 | 3/2013 | Krishna et al. |
| 2013/0079007 A1 | 3/2013 | Nagaraja et al. |
| 2013/0088983 A1 | 4/2013 | Pragada |
| 2013/0107798 A1 | 5/2013 | Gao et al. |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |

(56) References Cited

U.S. PATENT DOCUMENTS

| | | |
|---|---|---|
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0336200 A1* | 12/2013 | Andreozzi ............ H04W 40/22 |
| | | 370/315 |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0018090 A1 | 1/2014 | Khoryaev |
| 2014/0029524 A1 | 1/2014 | Dimou et al. |
| 2014/0031049 A1 | 1/2014 | Sundaresan |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0113643 A1 | 4/2014 | Ma et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0185467 A1 | 7/2014 | Heo |
| 2014/0194127 A1 | 7/2014 | Wang |
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226481 A1 | 8/2014 | Dahod |
| 2014/0226736 A1 | 8/2014 | Niu et al. |
| 2014/0233479 A1 | 8/2014 | Dahod |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0286256 A1 | 9/2014 | Chowdhury |
| 2014/0293906 A1 | 10/2014 | Chang et al. |
| 2014/0321282 A1 | 10/2014 | Pragada |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063166 A1 | 3/2015 | Sif |
| 2015/0063223 A1 | 3/2015 | Shen |
| 2015/0063231 A1 | 3/2015 | Seo et al. |
| 2015/0078162 A1 | 3/2015 | Prakash et al. |
| 2015/0087325 A1 | 3/2015 | Nuss et al. |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0215918 A1 | 7/2015 | Wu |
| 2015/0256314 A1 | 9/2015 | Gauvreau et al. |
| 2015/0288767 A1 | 10/2015 | Fargano |
| 2015/0289167 A1 | 10/2015 | Alex |
| 2015/0312778 A1 | 10/2015 | Chandrasekhar et al. |
| 2015/0318994 A1 | 11/2015 | Walsh et al. |
| 2015/0327140 A1* | 11/2015 | Eriksson ............ H04W 28/0247 |
| | | 455/438 |
| 2015/0341941 A1 | 11/2015 | Nguyen |
| 2015/0351072 A1 | 12/2015 | Okmyanskiy et al. |
| 2015/0365934 A1 | 12/2015 | Liu |
| 2015/0373698 A1 | 12/2015 | Uplenchwar et al. |
| 2015/0382242 A1 | 12/2015 | Sunavala |
| 2015/0382367 A1 | 12/2015 | Yanover et al. |
| 2016/0037550 A1 | 2/2016 | Barabell |
| 2016/0043944 A1 | 2/2016 | Felstaine |
| 2016/0057679 A1* | 2/2016 | Werner ............ H04W 28/08 |
| | | 455/444 |
| 2016/0073426 A1 | 3/2016 | Bull et al. |
| 2016/0100330 A1 | 4/2016 | Broustis |
| 2016/0191345 A1 | 6/2016 | Despotovic |
| 2016/0242147 A1 | 8/2016 | Tarlazzi |
| 2016/0277953 A1 | 9/2016 | Andersson |
| 2016/0344587 A1 | 11/2016 | Hoffman |

FOREIGN PATENT DOCUMENTS

| | | |
|---|---|---|
| CN | 103583065 A | 2/2014 |
| CN | 104620623 A | 5/2015 |
| CN | 104684052 A | 6/2015 |
| CN | 105407533 A | 3/2016 |
| EP | 1322048 | 6/2003 |
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2632072 | 8/2013 |
| EP | 2728926 | 5/2014 |
| EP | 2741533 | 6/2014 |
| EP | 2306761 | 7/2014 |
| EP | 2832150 | 2/2015 |
| EP | 2879444 | 6/2015 |
| EP | 2996422 | 3/2016 |
| GB | 2496908 | 5/2013 |
| GB | 2518584 | 4/2015 |
| WO | WO1998/024199 | 6/1998 |
| WO | WO2000/038351 | 6/2000 |
| WO | WO2007/074373 | 7/2007 |
| WO | WO2007/133135 | 11/2007 |
| WO | WO2010/006909 | 1/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/006769 | 1/2013 |
| WO | WO2013/041574 | 3/2013 |
| WO | WO2013/079913 | 6/2013 |
| WO | WO2013/082245 | 6/2013 |
| WO | WO2013/086659 | 6/2013 |
| WO | WO2013/144950 | 10/2013 |
| WO | WO2013/169991 | 11/2013 |
| WO | WO2014/001025 | 3/2014 |
| WO | WO2014/051630 | 4/2014 |
| WO | WO2014/059935 | 4/2014 |
| WO | WO2014/071308 | 5/2014 |
| WO | WO2014/087393 | 6/2014 |

OTHER PUBLICATIONS

"3GPP TS 23.401 V13.3.0 (Jun. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3$^{rd}$ Generation Partnership Project, 650 Route des Lucioles—Sophia Antipolis Valbonne—France, Jun. 2015; Sections 4 and 5 only.

(56) References Cited

OTHER PUBLICATIONS

"Cisco's One Platform Kit (onePK)," Networking Software (IOS & NX-OS), Cisco Systems, Inc., First published on or about Mar. 3, 2014; 2 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Fading," from Wikipedia, the free encyclopedia, Apr. 10, 2015; 6 pages.
"Quadrature amplitude modulation," from Wikipedia, the free encyclopedia, Apr. 22, 2015; 11 pages.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.
"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.
"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.
ETSI TS 123 401 V12.70 (Jan. 2015) Technical Specification: "LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.
"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
ETSI TS 125 367 V9.4.0, "Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN Iuh interface Home Node B (HNG) C13 Application Part (HNBAP) signaling (3GPP TS 25.469 version 9.3.0 Release 9)," ©European Telecommunications Standards Institute 2010; Oct. 2010; 64 pages.
ETSI TS 125 469 v11.2.0, "Universal Mobile Telecommunications System (UMTS); UTRAN Iuh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 129 061 V12.7.0 (Oct. 2014) Technical Specification: Digital cellular telecommunications system (Phase 2+); Universal

(56) References Cited

OTHER PUBLICATIONS

Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 [Sections 1 thru 9 only]; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Specification: LTE; Evolved Universal Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification C34 (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE Evolved Universal Terrestrial Radio Access (E-UTRA); Radio Resource Control (RRC); Protocol Specification (3GPP TS 36.331 version 21.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release

(56) References Cited

OTHER PUBLICATIONS

10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Net-

(56) References Cited

OTHER PUBLICATIONS work (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.
"3GPP TS 48.008 V8.8.0 (Dec. 2009) Technical Specification: 3rd Generation Partnership Project; Technical Specification Group GSM/ EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE Infocom 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages; https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages. http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.

Calhoun, P., "Diameter Base Protocol," Network Working Group RFC 3488, Sep. 2003; 147 pages.
Chauhan, Himanshu, "UE Measurements and Reporting in UMTS," Wireless Technologies, Blog dated Apr. 26, 2013; 3 pages. http://worldtechieumts.blogspot.com/2013/04/ue-measurements-and-reporting-in-umts.html.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/ LTE-A (2): eICIC (enhanced ICIC)," Netmanias Tech Blog, Aug. 6, 2014; 6 pages. http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
"Frame Structure—Downlink," Share Technote, first published on or about Jul. 9, 2012; 13 pages; http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto, University of OULU, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.

(56) References Cited

OTHER PUBLICATIONS

Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
La Rocca, Maurizio, "RSRP and RSRQ Measurement in LTE," Iaroccasolutions Technology & Services, Feb. 2, 2015; 9 pages http://www.laroccasolutions.com/training/78-rsrp-and-rsrq-measurement-in-lte.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013]; http://en.wikipedia.org/wiki/Link_Layer_Discovery_Protocol.
"LTE Physical Layer Overview," Keysight Technologies, First published on or about Aug. 24, 2014; 11 pages. http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www.radio-electronics.com/info/cellulartelecomms/let-long-term-evolutions/let-frame-subframe-structure.php.
"LTE Layers Data Flow," LTE Tutorial, tutorialspoint; first published on or about Jan. 17, 2013; 3 pages; http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, ©2012 Cisco and/or its affiliates. All Rights Reserved.; 40 pages.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages. http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
"QoS Class Identifier," from Wikipedia, the free encyclopedia, Oct. 7, 2015.
"Radius," Wikipedia, the free encyclopedia, 12 pages [Retrieved and printed Oct. 11, 2013] http://en.wikipedia.org/wiki/RADIUS.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
Tayal, Nitin, "All About PDCCH and CCE Allocation," Tayal's Way to Learn LTE, Tutorial Blog dated May 2013, 14 pages. http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-

(56) References Cited

OTHER PUBLICATIONS

LTE Downlink," International Journal of Mobile Netework Communications & Telematics (IJMNCT) vol. 2, No. 4, Aug. 2012; 8 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial GB1312321.1, 6 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document No. 3GPPEVOLUTIONWP; Jul. 2007; 27 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Jun. 16, 2016 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application No. 15183582.4.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
PCT Mar. 17, 2014 International Search Report and Written Opinion from International Application Serial No. PCT/IL2013/000086, 12 pages.
EPO Jul. 29, 2014 Extended Search Report from European Application Serial No. EP13195673, 12 pages.
Qualcomm Incorporation: "Design Objectives and Deployment Scenarios for Hetnets," 3GPP Draft R1-124528, $3^{rd}$ Generation Partnership Project (3GPP), Mobile Competence Centre; 650; Route Des Lucioles; F-06921 Sophia-Antipolis; Sep. 2012, XP050662404.
Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages XP050663076.
Ericsson, et al., "On the Feasibility of Operational Carrier Selection," 3GPP Draft R3-112991, 3rd Generation Partnership Project (3GPP), Mobile Competence Centre; 650; Route Des Lucioles; F-06921 Sophia-Antipolis; Nov. 2011, 7 pages XP050566183.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009 XP050340925.
Research in Motion UK Limited, "Scoping the UMTS HetNet Study," 3GPP Draft R1-124276, 3rd Generation Partnership Project (3GPP), Mobile Competence Centre; 650; Route Des Lucioles; F-06921 Sophia-Antipolis; Sep. 2012; XP050662177.
Telecom Italia, et al., "Self-optimization use case: self-tuning of cell reselction parameters for load balancing," 3GPP Draft R3-071432, 3rd Generation Partnership Project (3GPP), Mobile Competence Centre; 650; Route Des Lucioles; F-06921 Sophia-Antipolis; Aug. 2007 XP050162260.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 15/008,045, filed Jan. 27, 2016, entitled "System and Method for Providing Dynamic Radio Access Network Orchestration," Inventors: Virginia Rosa de Sousa Teixeira, et al.
U.S. Appl. No. 14/479,343, filed Sep. 7, 2014, entitled "Operation of Base Station in a Celllular Communication Network, " Inventor: Simon Burley.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.

(56) References Cited

OTHER PUBLICATIONS

U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Feb. 8, 2016, entitled "Mitigation of Uplink Interference Within Heterogeneous Wireless Communications Networks," Inventor: Pankaj Uplenchwar, et al.
U.S. Appl. No. 15/071,724, filed Mar. 16, 2016, entitled "Power Setting," Inventor: Pankaj Uplenchwar, et al.
U.S. Appl. No. 15/089,252, filed Apr. 1, 2016, entitled "Method and System for Dynamic Allocation of Resources in a Cellular Network," Inventors: Vladimir Yanover, et al.
Chinese Office Action for Application No. CN 201610563093.8 dated Feb. 1, 2019.

\* cited by examiner

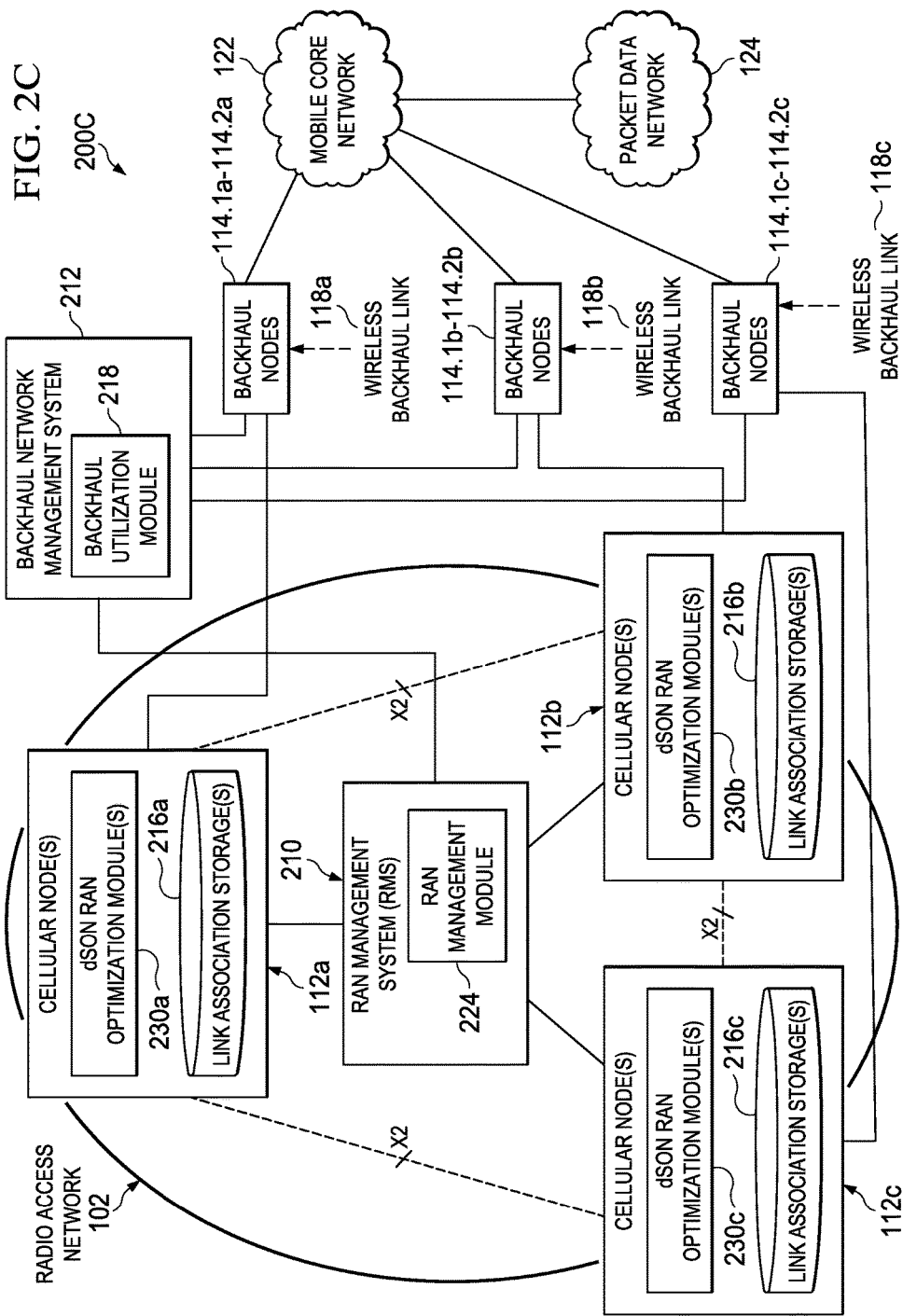

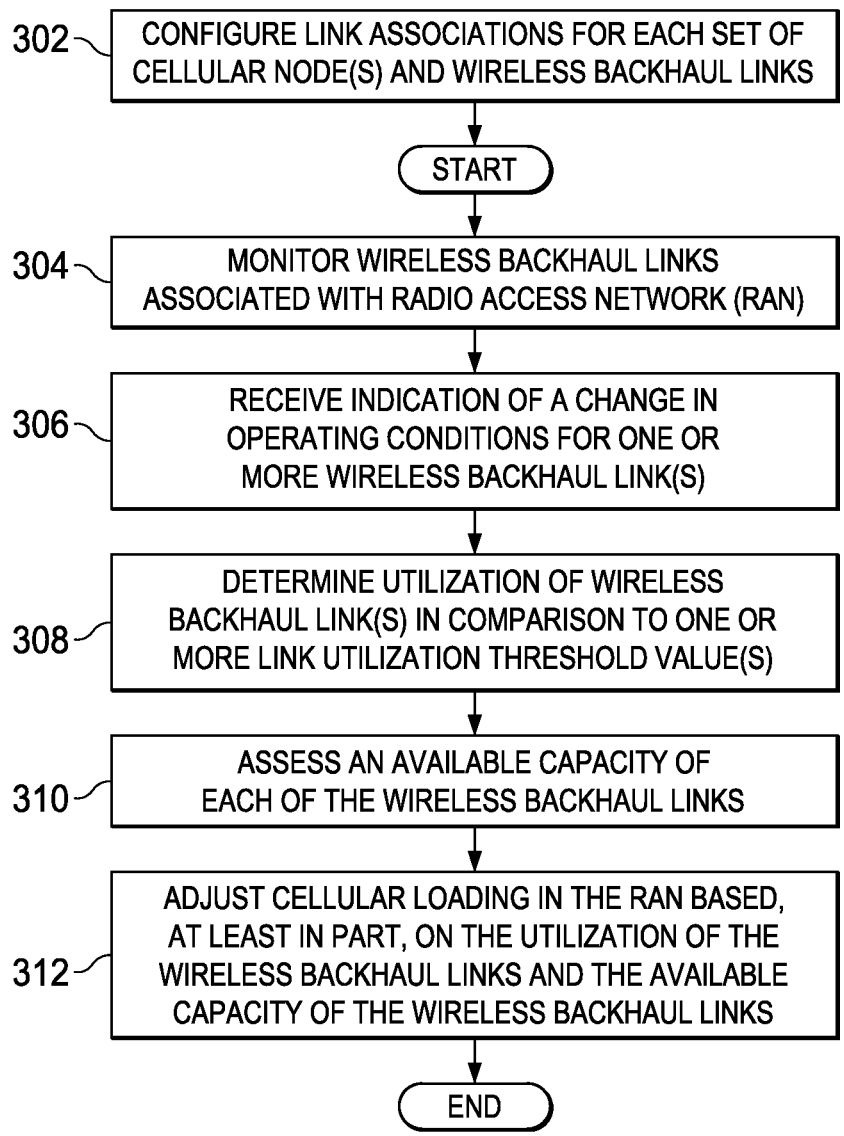

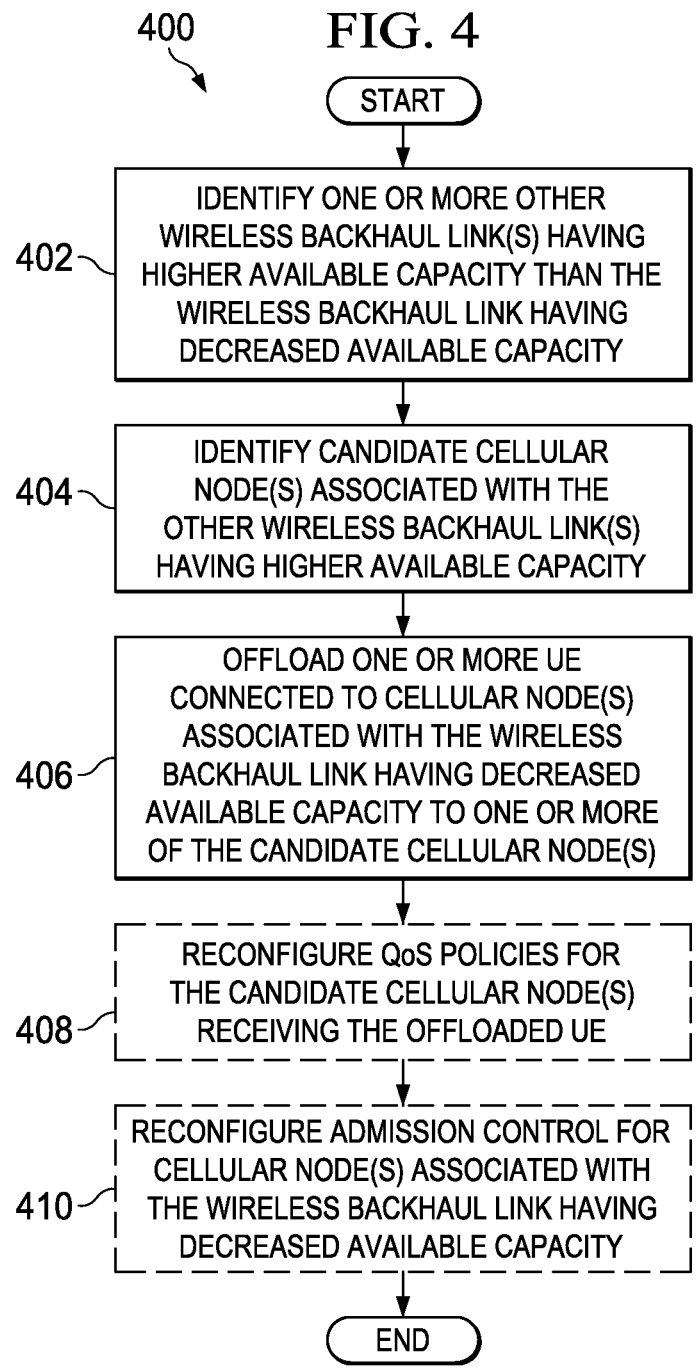

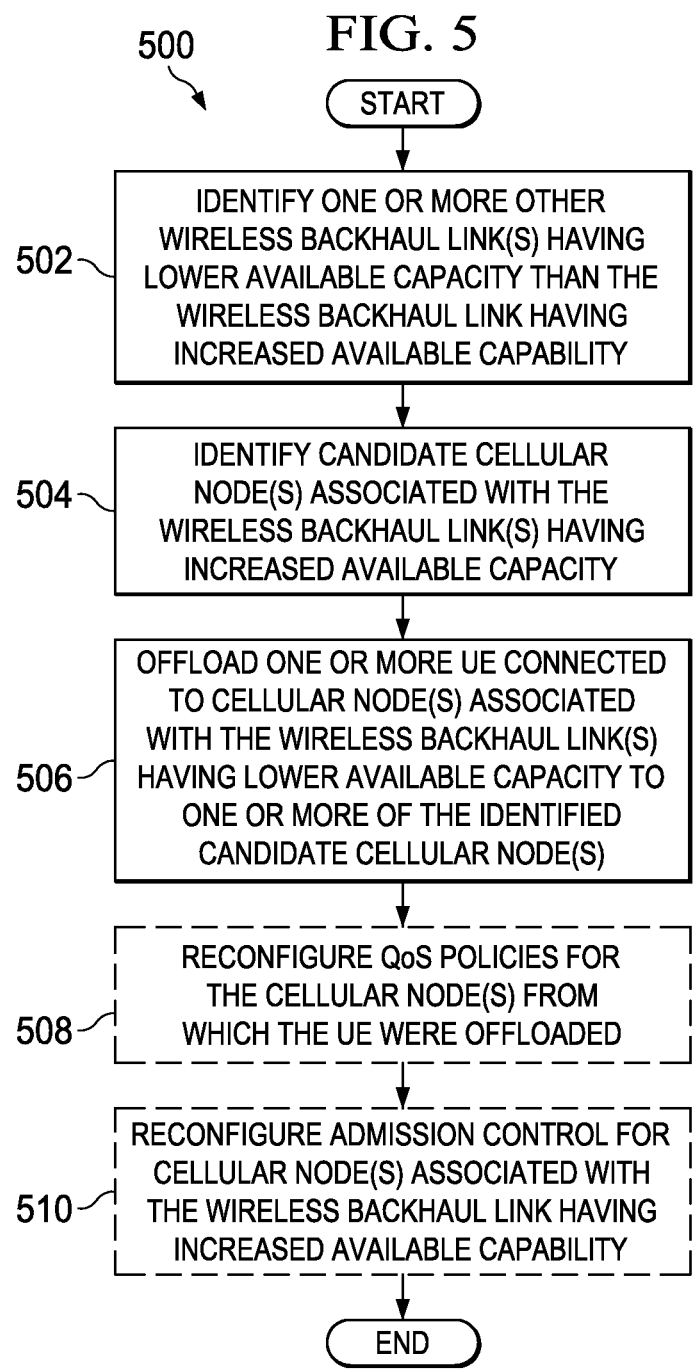

SYSTEM AND METHOD TO MANAGE NETWORK UTILIZATION ACCORDING TO WIRELESS BACKHAUL AND RADIO ACCESS NETWORK CONDITIONS

TECHNICAL FIELD

This disclosure relates in general to the field of communications and, more particularly, to a system and method to manage network utilization according to wireless backhaul and radio access network (RAN) conditions.

BACKGROUND

Networking architectures have grown increasingly complex in communication environments. Data traffic has grown extensively in recent years, which has significantly increased the demands on network resources. As the number of mobile subscribers increases, efficient management of communication resources becomes even more critical. Network topologies often include elements for a backhaul network that are used to move traffic "end-to-end" between cellular radios in a radio access network (RAN) and a core network or the internet. In some cases, operating conditions for the radio access network and backhaul elements can result in unbalanced utilization of network resources and can negatively impact user experience. Accordingly, there is a need to jointly managing the radio access network and the backhaul network to optimize the end-to-end utilization of network resources.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2C are simplified block diagrams illustrating other details associated with various potential embodiments of the communication system;

FIG. 3 is a simplified flow diagram illustrating example operations associated with managing network utilization according to wireless backhaul and RAN conditions to provide optimal e2e network resource utilization in accordance with one potential embodiment of the communication system;

FIG. 4 is a simplified flow diagram illustrating other example operations associated with managing network utilization that can be performed in accordance with one potential embodiment of the communication system;

FIG. 5 is a simplified flow diagram illustrating other example operations associated with managing network utilization that can be performed in accordance with one potential embodiment of the communication system.

DETAILED DESCRIPTION OF EXAMPLE EMBODIMENTS

Overview

Figure 1:
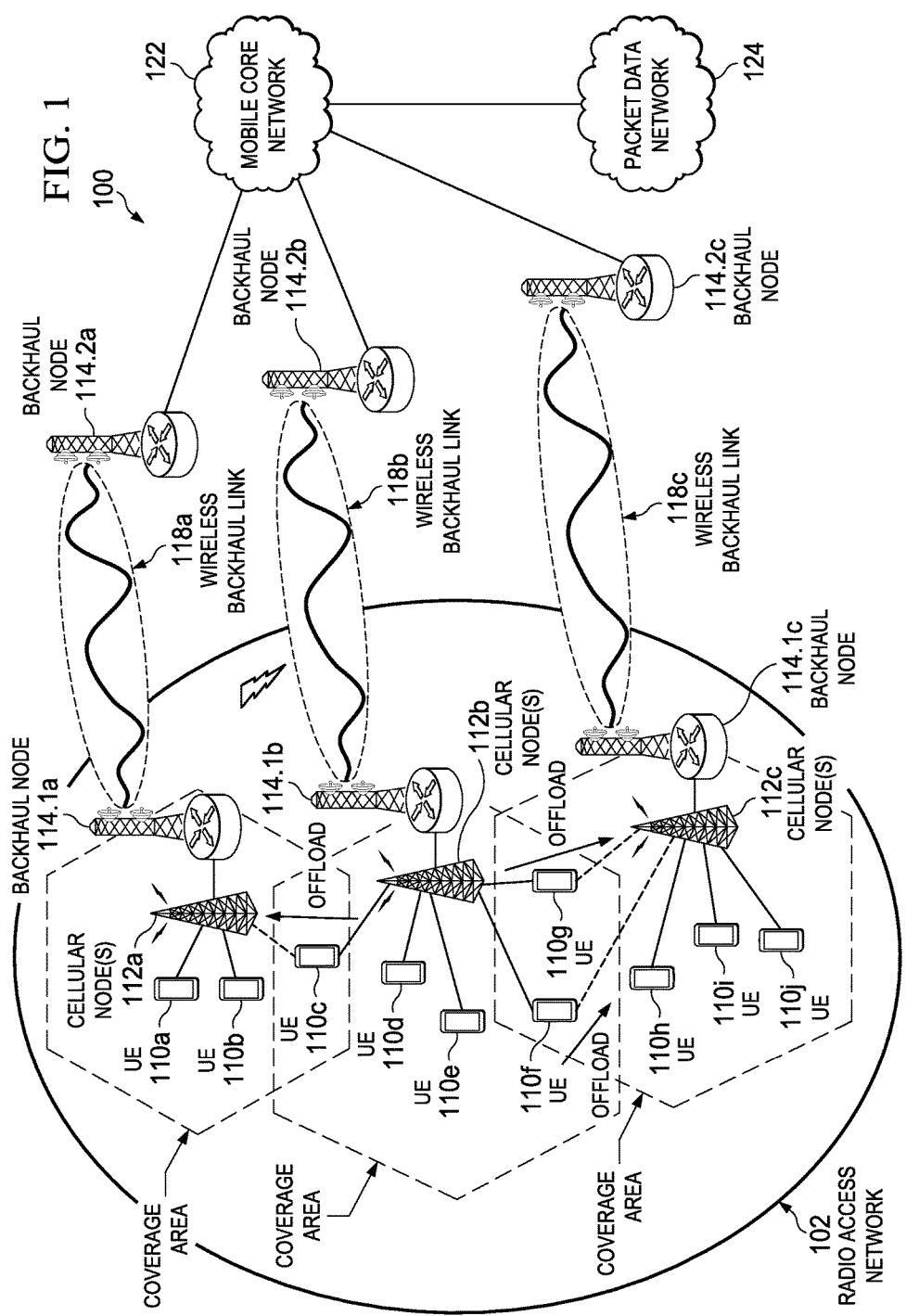
FIG. 1 is a simplified block diagram illustrating a communication system to facilitate managing network utilization according to wireless backhaul and radio access network (RAN) conditions to provide optimal end-to-end (e2e) network resource utilization according to one embodiment of the present disclosure.

A method is provided in one example embodiment and may include monitoring a plurality of wireless backhaul links associated with a radio access network (RAN); receiving an indication of a change in operating conditions for a first wireless backhaul link of the plurality of wireless backhaul links; determining utilization of the first wireless backhaul link based on the indication of the change in operating conditions; assessing an available capacity of each of the plurality of wireless backhaul links; and adjusting cellular loading in the RAN to balance utilization across the plurality of wireless backhaul links based, at least in part, on the utilization of the first wireless backhaul link and the available capacity of each of the plurality of wireless backhaul links. In some instances, the indication of the change in operating conditions can be associated with a throughput or capacity change event resulting in a change in the utilization of the first wireless backhaul link. In some instances, the indication of the change in operating conditions can include an indication of utilization of each of the plurality of wireless backhaul links.

In some cases, the method can include calculating the available capacity of each of the plurality of backhaul links based on a difference between throughput of each particular wireless backhaul link and a summation of user equipment traffic to be communicated through each wireless backhaul link. In still some cases, the method can include configuring link associations identifying a relationship between each particular wireless backhaul link and one or more cellular nodes for which user equipment traffic is communicated; and storing the link associations in at least one memory element. In still some cases, the method can include communicating the indication of the change in operating conditions for the first wireless backhaul link to one or more of: a RAN management system; a central self-organizing network (cSON) server associated with the RAN; one or more distributed self-organizing network (dSON) modules associated with the RAN, wherein each dSON management system is further associated with a set of one or more cellular nodes associated with a particular wireless backhaul link of the plurality of wireless backhaul links; and one or more cellular nodes associated with the RAN.

In some instances, determining the utilization of the first wireless backhaul link can include determining that the utilization is above a particular link utilization threshold for the first wireless backhaul link and adjusting the cellular loading in the RAN can further include: identifying one or more second wireless backhaul links from the plurality of wireless backhaul links that have higher available capacity than the first wireless backhaul link; identifying candidate cellular nodes in the RAN associated with the one or more second wireless backhaul links, wherein the candidate cellular nodes neighbor first cellular nodes associated with the first wireless backhaul link; and offloading one or more user equipment connected to one or more of the first cellular nodes associated with the first wireless backhaul link to one or more of the candidate cellular nodes in the RAN associated with the one or more second wireless backhaul links.

In other instances, determining the utilization of the first wireless backhaul link can include determining that the utilization is below a particular link utilization threshold for the first wireless backhaul link and adjusting the cellular loading in the RAN can further include: identifying one or more second wireless backhaul links from the plurality of wireless backhaul links that have lower available capacity than the first wireless backhaul link; identifying candidate cellular nodes in the RAN associated with the first wireless backhaul link, wherein the candidate cellular nodes neighbor the second cellular nodes associated with the one or more second wireless backhaul links; and offloading one or more user equipment connected to one or more of the second cellular nodes associated with the one or more second wireless backhaul links to the candidate cellular nodes in the RAN associated with the first wireless backhaul link.

EXAMPLE EMBODIMENTS

Turning to FIG. 1, FIG. 1 is a simplified block diagram illustrating a communication system 100 to facilitate managing network utilization according to wireless backhaul and radio access network (RAN) conditions to provide optimal end-to-end (e2e) network resource utilization according to one embodiment of the present disclosure. This particular configuration may be tied to the 3rd Generation Partnership Project (3GPP) architecture for the Evolved Packet System (EPS) architecture, also sometimes referred to as the Long Term Evolution (LTE) EPS architecture. Alternatively, the depicted architecture may be applicable to other environments equally.

The example architecture of FIG. 1 may include users operating user equipment (UE) 110a-110j, a radio access network (RAN) 102, a first set of one or more cellular node(s) 112a, a second set of one or more cellular node(s) 112b, a third set of one or more cellular node(s) 112c, a mobile core network 122 and a packet data network (PDN) 124.

Respective sets of cellular node(s) 112a-112c may be associated respective cellular coverage areas, or more generally, coverage areas, which are illustrated in FIG. 1 as a respective dashed-line hexagonal box surrounding respective sets of cellular node(s) 112a-112c. In various embodiments, the coverage area for respective sets of cellular node(s) 112a-112c may represent an area in which UE may be capable of connecting to (e.g., communicating with) one or more cellular node(s) 112a-112c. As shown in FIG. 1, coverage areas for sets of cellular node(s) 112a-112c may overlap each other. It should be understood that the respective coverage area(s) for respective cellular node(s) 112a-112c as shown in FIG. 1 are provided for illustrative purposes only and are not meant to limit the broad scope of the teachings of the present disclosure. Further, although only one cellular node is illustrated for each of the first, second and third sets of cellular nodes, it should be understood that multiple cellular nodes can be present, which may contribute to the coverage area of each set of cellular node(s). Additionally, it should be understood that any number of sets of one or more cellular node(s) may be present in communication system 100 within the scope of the teachings of the present disclosure.

A first pair of backhaul nodes 114.1a-114.2a may be logically connected to the first set of cellular node(s) 112a and may provide a first wireless backhaul link 118a between any UE connected to cellular node(s) 112a (e.g., UE 110a-110b shown in FIG. 1) and mobile core network 122 and/or PDN 124. A second pair of backhaul nodes 114.1b-114.2b may be logically connected to the second set of cellular node(s) 112b and may provide a second wireless backhaul link 118b between any UE connected to second cellular node(s) 112b (e.g., UE 110c-110g shown in FIG. 1) and mobile core network 122 and/or PDN 124. A third pair of backhaul nodes 114.1c-114.2c may be logically connected to the third set of cellular node(s) 112c and may provide a third wireless backhaul link 118c between any UE connected to cellular node(s) 112c (e.g., UE 110h-110j shown in FIG. 1) and mobile core network 122 and/or PDN 124. As referred to herein in this Specification, the terms 'wireless backhaul link', 'backhaul link' and 'link' can be used interchangeably.

Further, as referred to herein in this Specification, backhaul nodes 114.1a-114.2a, 114.1b-114.2b, 114.1c-114.2c can be collectively referred to as a 'backhaul network' or a 'wireless backhaul network'. It should be understood that each backhaul node 114.1a-114.2a, 114.1b-114.2b, 114.1c-114.2c can be associated with a backhaul network architecture that may include one or more routers, gateways, load balancers, etc. in order to move traffic between RAN 102, the backhaul network and the mobile core network 122 or packet data network 124. In various embodiments, traffic from RAN 102 (e.g., from cellular nodes within RAN 102) may be fed to each corresponding backhaul node 114.1a, 114.2a, 114.2c via corresponding one or more cell site routers associated with each backhaul node.

As referred to herein in this Specification, wireless backhaul links (e.g., first wireless backhaul link 118a, second wireless backhaul link 118b, third wireless backhaul link 118c, etc.) can be identified using a label 'L(x)', where 'x' can be 1, 2, 3, etc. (e.g., L(1) representing first wireless backhaul link 118a, etc.). Each wireless backhaul link L(x) may be associated with a corresponding set of cellular node(s) N(x) whose traffic (e.g., data traffic, control traffic, etc.) flows through the corresponding wireless backhaul link L(x). For example, in various embodiments, N(x) could be associated with one or more sets of cellular nodes 112a, 112b, 112c. In various embodiments, an available capacity of a corresponding wireless backhaul link L(x) can be identified using a label 'C(x)' in which C(x) can be determined as the difference between the throughput rate of wireless backhaul link L(x) at any instant in time and the summation of the traffic load on cellular nodes N(x) associated with wireless backhaul link L(x).

RAN 102 may provide a communications interface between UE 110a-110j and mobile core network 122 and/or PDN 124 via sets of respective cellular node(s) 112a, 112b and 112c and respective backhaul nodes 114.1a-114.2a, 114.1b-114.2b and 114.1c-114.2c. In various embodiments, RAN 102 may include 3GPP access networks such as, for example, Global System for Mobile Communications (GSM) Enhanced Data Rates for GSM Evolution (EDGE) Radio Access Network (GERAN), generally referred to as 2G, Universal Mobile Telecommunications System (UMTS) Terrestrial Radio Access Network (UTRAN), generally referred to as 3G, and/or evolved UTRAN (E-UTRAN), generally referred to as 4G, Long Term Evolution (LTE) or LTE-Advanced (LTE-A). In various embodiments, RAN 102 may include non-3GPP IP access networks such as digital subscriber line (DSL), Cable, wireless local area network WLAN (e.g., Wireless Fidelity (WiFi), Worldwide Interoperability for Microwave Access (WiMAX)) or the Internet. In some embodiments, RAN 102 can include a RAN management system (RMS), a backhaul network management system, combinations thereof or the like to manage capacity (e.g., loading) and/or operation of sets of cellular node(s) 112a-112c and/or backhaul nodes 114.1a-114.2a, 114.1b-114.2b and 114.1c-114.2c for wireless backhaul links 118a-118c.

In various embodiments, mobile core network 122 may include other network appliances, nodes, elements, gateways, etc. that may make up an Evolved Packet Core (EPC)

for 3GPP LTE EPS architectures as provided in 3GPP specifications, including, for example, 3GPP Technical Specification (TS) 23.401. In various embodiments, mobile core network 122 may include other network appliances, nodes, elements, gateways, etc. that may make up a Mobile Packet Core (MPC) for 3G circuit-switched (CS) and/or packet-switched (PS) architectures as provided in 3GPP specifications. In various embodiments, mobile core network 122 may include network appliances, nodes, elements, gateways, etc. to provide various UE services and/or functions, such as, for example, to implement Quality-of-Service (QoS) on packet flows, to provide connectivity for UE 110a-110j to external data packet networks (e.g., PDN 124) to provision packet-switched (PS) and/or circuit-switched (CS) services (e.g., voice and/or video routing), to provide enhanced services such as, for example, Voice over LTE (VoLTE), enhanced charging, stateful firewalls and/or traffic performance optimization (TPO), etc. Thus, it should be understood that mobile core network 122 may provide for a myriad of architectures to facilitate UE connectivity, control, operation etc. between RAN 102, the backhaul network and packet data network 124.

In various embodiments, PDN 124 can represent a series of points or nodes of interconnected communication paths (wired or wireless) for receiving and transmitting packets of information that propagate through communication system 100. PDN 124 may offer communicative interfaces between various elements of communication system 100 and may be any local area network (LAN), wireless local area network (WLAN), metropolitan area network (MAN), wide area network (WAN), virtual private network (VPN), enterprise network, Intranet, extranet, or any other appropriate architecture or system that facilitates communications in a network environment. In various embodiments, RAN 102, mobile core network 122 and/or PDN network 124 may implement user datagram protocol/Internet protocol (UDP/IP) connections and/or Transmission Control protocol/Internet protocol (TCP/IP) connections in particular embodiments of the present disclosure. However, RAN 102, mobile core network 122 and/or PDN 1245 may alternatively implement any other suitable communication protocol for transmitting and receiving data packets within communication system 100.

In various embodiments, UE 110a-110j are mobile devices having multi-mode communication capabilities and are able to communicate with cellular nodes (e.g., any of the sets of cellular node(s) 112a-112c) using one or more internal cellular radios (e.g., transmitters/receivers) capable of mobile cellular connections such as 4G/LTE, 3G, and/or 2G connections. In various embodiments, UE 110a-110j can be associated with users, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 110a-110j may also be inclusive of a suitable interface to a human user such as a microphone, a display, a keyboard, or other terminal equipment. As used herein in this Specification, the terms 'user' and 'subscriber' may be used interchangeably.

UE 110a-110j may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 110a-110j may have a bundled subscription for network access and application services (e.g., voice, multimedia), etc. Once an access session is established for a given user, the user can register for application services as well without additional authentication requirements. IP addresses can be assigned using dynamic host configuration protocol (DHCP), Stateless Address Auto-configuration, default bearer activation processes, etc., or any suitable variation thereof.

In general, any of cellular node(s) 112a-112c can offer suitable connectivity to one or more UE (e.g., UE 110a-110j) via respective coverage areas for the sets of cellular node(s) 112a-112c for one or more access network types (e.g., 4G/LTE, 3G, 2G) using any appropriate protocol or technique. For 4G/LTE deployments, sets of cellular node(s) 112a-112c can be deployed as evolved Node Bs (interchangeably referred to as eNodeBs or eNBs) for macro networks and/or as Home evolved Node Bs (HeNBs) for small cell networks. For 2G/3G deployments sets of cellular node(s) 112a-112c can be deployed as Node Bs (interchangeably referred to as NodeBs or NBs) for macro networks and/or as Home Node Bs (HNBs) for small cell networks. In general, small cell network cellular nodes differ from macro cell network cellular nodes in terms of coverage area. Typically, small cell network cellular nodes operate at lower power levels as compared to macro cell network cellular nodes to provide coverage in a business or residential environment (e.g., within a building, home, etc.) where coverage from macro cell networks may be limited due to interference from walls, roofs, etc.

In general, eNodeBs for can be responsible for selecting a Mobility Management Entity (MME) (not shown) within mobile core network 122 for session establishment for each UE 110a-110j, for managing radio resources for each UE 110a-110j, and coordinating handovers for UE 110a-110j between cellular nodes. In general, a NodeB can be deployed in combination with a Radio Network Controller (RNC), which can be included within or separate from NodeB equipment. For 2G/3G deployments, the combination of NodeB/RNC can perform similar functions as an eNodeB. For small cell networks, HeNBs and/or HNBs/RNCs can provide similar functions via communications with one or more HeNB gateways and/or HNB gateways, which can communicate with mobile core network 122.

Before detailing various operational aspects of FIG. 1, it is important to understand common characteristics of wireless backhaul links, as generally provided in commercial architectures. The following foundation is offered earnestly for teaching purposes only and therefore should not be construed in any way to limit the broad teachings of the present disclosure.

Traffic on mobile networks is growing exponentially through the widespread use of powerful mobile devices and data-heavy multimedia services. Since network resources in mobile networks are limited through radio spectrum allocation and often a budget for capital expenditure, this traffic growth is increasingly causing resource shortage in the Radio Access Network (RAN). These shortages, in turn, can cause RAN congestion which can dramatically reduce subscriber quality of experience (QoE). Some current approaches that attempt to solve these problems include methods to optimize RAN behavior and performance by 1) configuration of certain cellular node parameters, and 2) by self-organizing/optimizing network (SON) algorithms that work across a set of cellular nodes to attempt to relieve congestion. However, these current approaches are limited to information obtained only from the local state of the RAN.

In many mobile network topologies, wireless transport interfaces are used to backhaul traffic from cellular nodes in the RAN to the mobile core network and/or packet data networks and are therefore sometimes referred to as wireless backhaul interfaces. Wireless backhaul interfaces for a backhaul network can connect RAN cellular nodes to the mobile core network core using various backhaul network topologies, such as 1) rings, 2) hub and spoke, 3) daisy chains, 4) meshes, etc. Typically, there are multiple router hops that occur for traffic communicated between cellular nodes and wireless backhaul interfaces before the traffic is communicated over the wireless backhaul interface to/from the mobile core network and/or PDN. The topology of the backhaul network can affect the number of hops for traffic.

The most common wireless backhaul interface for macro cellular nodes is microwave, typically utilizing the 6 Gigahertz (Ghz)-56 Ghz frequency band, provided via wireless backhaul nodes, which are typically installed on dedicated towers to provide point-to-point and line-of-sight links. With the advent of small cell networks as a means of increasing mobile network coverage and capacity, small cell cellular nodes in urban areas are being deployed in locations such as sides of buildings, lampposts, street lights and other street furniture. Since line-of-sight is typically not available between wireless backhaul nodes for small cell networks, wireless interfaces in the sub-6 Ghz range are being developed in the industry to backhaul traffic from such small cell nodes to the mobile core network and/or packet data networks. Because of the scale of deployment of small cells as well as capital expenditure (capex) (e.g., licensing costs of point-to-point microwave links) and/or operational expenditures (opex) constraints can be prohibitive, several other frequency bands in the unlicensed spectrum such as E-band (i.e., 60-90 GHz), V-band (e.g., 40-75 GHz) and satellite are increasingly being used for wireless backhaul transport. Wireless backhaul transport has become a dominating backhaul technology for outdoor small cells.

The throughput rate (or user bit rate) that a given wireless backhaul link can support is a function of modulation bits/symbol and coding rate. As referred to herein in this Specification, the terms 'throughput' and 'throughput rate' can be used interchangeably. In general, the throughput for a wireless backhaul link can be expressed in gigabits per second (Gb/sec). Wireless backhaul links are typically designed with a sufficient reserved fading margin (typically 30-40 decibel (dB)) to cater for signal deterioration. Adaptive coding and modulation (ACM) techniques are often used to adjust wireless backhaul links to trade throughput rate for system gain. For example, when propagation conditions are good for a wireless backhaul link, ACM may be used to adjust modulation order and coding rate for the link to use up the reserved fading margin in system gain with higher orders of quadrature amplitude modulation (QAM), for example 256 QAM or higher, and/or using less robust coding (e.g., more data payload and less coding overhead) to turn the reserved fading margin into increased capacity (e.g., an increased link throughput rate). However, when propagation conditions deteriorate for a wireless backhaul link (e.g., during a rain storm), the reserved fading margin can be used up to maintain link availability by lowering the QAM level, say, for example lowering from 256 QAM to 128 QAM, and/or strengthening the coding (e.g., less data payload and more coding bits), either of which can result in a reduced link throughput rate. Typically, the switchover between different modulation orders/levels and coding rates is errorless and hitless; meaning that adjustments can be made without causing errors in the system. In some cases, power modulation can also be used to adjust the trade-off between throughput and system gain.

As referred to herein in this Specification, the term 'available capacity' can represent to the difference between a throughput rate as configured for a wireless backhaul link at any given time and the summation of the traffic on the cellular node(s) feeding the link. Available capacity can also relate to a utilization percentage for a wireless backhaul link, more generally referred to as link utilization. Link utilization can be determined for a wireless backhaul link by dividing the summation of traffic feeding the link by the throughput rate for the link. Link utilization can be represented fractionally or as a percentage (e.g., by multiplying by 100).

As discussed above, throughput rate for a link can be varied through ACM adjustments, however, variations in throughput rate can affect link utilization, as the summation of traffic feeding a link may not change even though throughput rate for the link has been changed. For example, poor propagation conditions for a given wireless backhaul link can result in ACM changes (e.g., decreased modulation order and/or increased coding rate) that can result in reduced throughput rate for the link. Consider, for example, a link that has a maximum or designed capacity capable of supporting a throughput rate of one (1) gigabits per second (Gb/sec) of data in optimal propagation conditions for a best-case ACM scheme for a given range (e.g., say 1 kilometer) at a given power level. However, in suboptimal propagation conditions (e.g., bad weather, bad environmental conditions, deployment interference, etc.) ACM changes to the link may cause the throughput rate of the link to be reduced, say, for example to 0.5 Gb/sec. If, for example, the total traffic feeding the link (e.g., total contribution of traffic from different cell site routers feeding the link) is approximately 0.5 Gb/sec, then under optimal propagation conditions, utilization for the link may be at approximately 50%; however, under suboptimal propagation conditions, link utilization may increase to approximately 100%, which can result in congestion for the link and/or for traffic being fed into the link.

In current deployments, RAN configuration and SON algorithms typically work locally in the RAN and are impervious and/or unaware of capacity changes and/or throughput changes in wireless backhaul links, which leads to sub-optimal methods for managing congestion in the RAN and/or the backhaul network. For example, in some situations, highly loaded cellular nodes may be feeding into a wireless backhaul link, which has had its throughput rate dynamically reduced for a period of time, compared to another wireless backhaul link, which may have a higher throughput rate and may be carrying traffic from lightly loaded cellular nodes. However, in current deployments, there is no way of identifying situations of wireless backhaul links having reduced or increased throughput rate and/or reduced or increased link utilization, especially in a dynamically changing environment, and also no way configuring or re-configuring the highly loaded cellular nodes to make adjustments for limited wireless backhaul link throughput and/or offloading traffic from the highly loaded cellular nodes to the lightly loaded cellular nodes. These situations can result is under-utilizing available capacity in the RAN and/or backhaul network at the expense of subscriber quality of experience because of a lack of an end-to-end (e2e) perspective on overall network utilization.

In accordance with one embodiment, communication system 100 can overcome the aforementioned shortcomings (and others), by providing a system and method to adjust loading for cellular node(s) 112a-112c based, at least in part, on capacity or throughput change events for wireless backhaul links 118a-118c. In various embodiments, the capacity or throughput change events can be used to trigger one or more operations to adjust cellular loading in RAN 102 to balance utilization across wireless backhaul links 118a-118c of backhaul network depending on one or more of: available capacity, throughput and/or link utilization of wireless backhaul links 118a-118c in order to optimize e2e utilization of network resources within communication system 100, which, in some embodiments can result in capex/opex savings for network operators and/or service providers. In various embodiments, the operations to adjust cellular loading in RAN 102 can include, but not be limited to, adjusting loading of cellular node(s) 112a-112c in RAN 102 by handing-over UEs between cellular node(s) 112a-112c; by adjusting admission control for cellular node(s) 112a-112c; and/or by adjusting policy control for cellular node(s) 112a-112b in order to optimize e2e utilization of network resources.

In at least one embodiment, the method provided by communication system 100 can include maintaining an association of sets of cellular node(s) each backhaul link they affect for a given network topology (e.g., for RAN 102), generally referred to herein as 'link association'. For example, for RAN 102, link associations can be maintained that associate the first set of one or more cellular node(s) 112a with first wireless backhaul link 118a; that associate the second set of one or more cellular node(s) 112b with second wireless backhaul link 118b; and that associate the third set of one or more cellular node(s) 112c with third wireless backhaul link 118c. As noted previously, the relationship representing available capacity C(x) for each wireless backhaul link L(x) for which traffic to/from a set of cellular nodes N(x) flows through can be determined as the difference between the throughput rate for each wireless backhaul link at any instant and the summation of the traffic load on cellular nodes N(x) feeding each wireless backhaul link.

In some embodiments, a backhaul network management system, discussed in further detail below, may maintain a mapping of respective cellular node(s) 112a, 112b, 112c to corresponding cell cite routers for respective backhaul nodes 114.1a, 114.1b, 114.1c, which may comprise link associations for communication system 100. For example, for every cell site router associated with a corresponding backhaul node there may be maintained a list of cellular node(s) that connect thereto. In various embodiments, this mapping information may be static and may be configured by a network operator, service provider, etc. at the time of network configuration, any time a new cellular node and/or cell site router may be added or removed from communication system 100, etc. In some embodiments, link associations can be can be communicated to RAN 102 (e.g., to one or more elements maintaining and/or managing cellular nodes within RAN 102).

In addition to maintaining link associations, in some embodiments, the backhaul network management system may maintain or track the contribution of traffic from each cell site router for each backhaul node in order to determine loading and/or link utilization for each wireless backhaul link 118a-118c. Given the dynamic nature of possible user movement within communication system 100, the traffic being fed to each backhaul node 114.1a, 114.1b, 114.1c can change dynamically through time. In various embodiments, the backhaul network management system may monitor—continuously, periodically, and/or in response to one or more event triggers—the traffic for each cell site router associated with each backhaul node in order to calculate the contribution of traffic from the cell site routers for each backhaul node 114.1a, 114.1b, 114.1c in order to determine loading and/or link utilization information. In various embodiments, the traffic calculations in combination with the link association information can be used to determine one or more sets of cellular node(s) that may be contributing to congestion for a particular wireless backhaul link.

In various embodiments, link associations may be configured to indicate sets cellular node(s) and corresponding backhaul links that are not on a same direct link-to-link path (without any other backhaul nodes in-between). In various embodiments, associations maintained for cellular node(s) and corresponding wireless backhaul links can be provided in any suitable storage within and/or across one or more elements that may be configured in communication system 100. In various embodiments, depending on implementation architecture, link associations between respective sets of cellular node(s) 112a-112c and respective wireless backhaul links 118a-118c can be maintained either in a central location such as a management system for RAN 102, a management system for wireless backhaul nodes 114.1a-114.2a, 114.1b-114.2b, 114.1c-114.2c for the backhaul network, a centralized SON server, distributed SON servers and/or mobile core network 122.

During operation for at least one embodiment, the method provided by communication system 100 can facilitate various operations including, but not limited to: 1) maintaining link association information for each corresponding set of cellular node(s) 112a-112c and each corresponding wireless backhaul link 118a-118c that they affect; 2) communicating, to RAN 102 (e.g., one or more control, management, etc. elements within RAN 102), an indication of a capacity or throughput change event that results in a capacity or throughput change for one or more wireless backhaul link 118a-118c and other backhaul network related information; and 3) upon receiving such indication(s), adjusting cellular loading in RAN 102 using the link association information and backhaul related information to optimize e2e utilization of network resources for communication system 100, which can help to relieve congestion within RAN 102 and/or within the backhaul network (e.g., for wireless backhaul links 118a-118c).

In various embodiments, when the capacity or throughput of a given wireless backhaul link changes, an indication of the capacity or throughput change event along with other backhaul network related information (e.g., a new available capacity of the associated wireless backhaul link(s), link utilization, throughput, latency, jitter, etc.) can be signaled to RAN 102 (e.g., to an element, node, system, etc. managing one or more cellular nodes within RAN 102). In various embodiments, an indication of a capacity or throughput change event can be generated by a management system associated with the backhaul network (e.g., a backhaul network management system), by an element or node within mobile core network 122, by a centralized SON server (internal or external to RAN 102), combinations thereof or the like.

Capacity or throughput change events can be triggered under a variety of conditions. In some embodiments, a capacity or throughput change event can be triggered upon a determination of an ACM adjustment for one or more wireless backhaul link(s) (e.g., a change in modulation order and/or coding rate). In some embodiments, a capacity or throughput change event can be triggered upon a determination of an increase or decrease in cell site traffic being fed into one or more wireless backhaul link(s) (e.g., resulting in a change in link utilization). In some embodiments, a capacity or throughput change event can be triggered upon a determination of carrier aggregation for a given wireless backhaul link. In general, carrier aggregation refers to a technique in which carrier frequencies for a wireless backhaul link are aggregated together to provide increased throughput rate for the link. In some embodiments, a capacity or throughput change event can be triggered upon determination of an antenna modulation change for a given wireless backhaul link. In general, antenna modulation may refer to adjustments to antenna alignment, dispersion radius, angle and/or elevation (e.g., beamforming), to adjust antenna gain, which can result in throughput rate and/or range changes for a given wireless backhaul link.

In various embodiments, communication of a capacity or throughput change event and/or other backhaul network related information can be communicated in the form of a message, packet, vendor specific attribute value pair (AVP), Information Element, combinations thereof or the like and can include, one or more of: an identifier (ID) for the associated wireless backhaul link(s) for which capacity or throughput conditions have changed, new available link capacity of all or select wireless backhaul link(s) (e.g., for only those link(s) that have experienced capacity or throughput changes or for all links); current link utilization or throughput of all or select wireless backhaul link(s); latency information and/or jitter information (e.g., how much latency may fluctuate) for all or select links. In some embodiments, parameters associated with ACM changes (e.g., modulation order, coding rate) can be included the backhaul network related information. In some embodiments, wireless backhaul network topology related information (e.g., spoke, hub, etc. and/or hop information) may be included in the backhaul related information, for example, if routers, elements, etc. are added or removed, taken online or offline for the backhaul network; upon initialization or power-up of certain equipment for the backhaul network; and/or based on operator and/or service provider configuration.

In various embodiments, flags, code words, combinations thereof or the like could be set in change event messages to indicate certain types of changes (e.g., ACM changes, carrier aggregation changes, antenna modulation changes, etc.). In some embodiments, the backhaul network management system may track historical conditions for wireless backhaul links 118a-118c in order to generate information that can be included in change event messaging to indicate increased/decreased modulation levels and/or increased/decreased coding strength. In some embodiments, one or more elements within RAN 102 may track historical conditions for wireless backhaul links 118a-118c based on received change event messages.

Upon receiving an indication of capacity or throughput change event(s) and any other backhaul network information that may be included with the indication, link utilization can be determined for any wireless backhaul link(s) associated with the capacity or throughput change event(s). The link utilization for one or more wireless backhaul link 118a-118c can be compared with one or more configurable threshold link utilization value(s) that may be configured and/or re-configured (e.g., updated) for each wireless backhaul link 118a-118c. Based on the threshold comparisons, various operations can be performed to adjust cellular loading in RAN 102 to balance utilization across wireless backhaul links 118a-118c.

In various embodiments, multiple threshold link utilization values can be configured for a given link. In some embodiments, threshold link utilization values can be configured by a network operator, service provider, etc. to correspond to different operating conditions for the link (e.g., ACM modulation order and/or coding rate, available capacity for the link, antenna gain, modulation power, combinations thereof or the like).

For example, in some embodiments, one or more high link utilization threshold value(s) can be configured for each wireless backhaul link 118a-118c. In various embodiments, high link utilization threshold value(s) may be associated with capacity or throughput conditions for a given link in which, if link utilization increases below a given high link utilization threshold value, one or more operations may be triggered that may result in reducing traffic feeding into the link in order to reduce possible congestion for the link. In some embodiments, one or more low link utilization threshold value(s) can be configured for each wireless backhaul link 118a-118c. In various embodiments, low link utilization threshold value(s) may be associated with capacity or throughput conditions for a given link in which, if link utilization decreases below a given low link utilization threshold value, one or more operations may be triggered that may allow more traffic to be fed into the link. In various embodiments, high and low link utilization threshold(s) for a given wireless backhaul link can be configured in relation to a maximum or designed capacity for the given wireless backhaul link (e.g., 75% of max or designed capacity for a link may be used to set a certain high link utilization threshold value for the link and 25% of max or designed capacity for a link may be used to set a certain low link utilization threshold value for the link). Link utilization threshold values need not be limited to high and low threshold values. In some embodiments, one or more single link utilization threshold value(s) may be configured for each wireless backhaul link. As throughput rate, traffic being fed into a link and available capacity for a link are all related to link utilization, it should be understood other threshold comparisons can be performed in order to determine one or more operations within the scope of the present disclosure.

In some embodiments, threshold link utilization values can be configured by a network operator, service provider, etc. based on how much utilization margin is desired to be maintained across wireless backhaul links 118a-118c. In various embodiments, utilization margin can depend on an operator's understanding of user behavior, periods of surges in user demand, etc. in RAN 102. For example, in some embodiments, an operator may determine or set a link utilization threshold value of 75% for wireless backhaul links 118a-118c. In some cases during operation, the backhaul network management system can continuously monitor the links for their utilization level and/or re-compute utilization when there is a throughput or capacity change event and, if any link exceeds the 75% threshold value, the management system can communicate an indication the change event and other backhaul network related information to RAN 102.

In at least one embodiment, upon determining that utilization for a certain wireless backhaul link say, for example wireless backhaul link 118b, exceeds a certain link utilization threshold value, one or more operations can be performed to adjust the loading of cellular node(s) 112b associated the wireless backhaul link 118b using a SON algorithm to offload or limit UE connected to cellular node(s) 112b to relieve congestion for cellular node(s) 112b and/or wireless backhaul link 118b.

To illustrate various operations that can be performed involving offloading UE from one set of cellular node(s) to another set of cellular node(s), consider a general example case in which the utilization of a given link L(i) (where 'i' can be any link 1, 2, 3, etc.) for a given set of cellular node(s) N(i) increases beyond a given link utilization threshold value configured for the link. In at least one embodiment, upon determining that link utilization for link L(i) has increased beyond the link utilization threshold value for the link, one or more candidate cellular node(s) to receive hand-over of UE connected to cellular node(s) N(i) can be selected from another set of cellular node(s) N(j) (where 'j' can be associated with any link other than 'i') such that C(j)>C(i) and cellular node(s)/links associated with i and j are not on a direct link-to-link path (without any other backhaul nodes in-between). The condition between links i and j is important to ensure that traffic load on one of link does not affect the other link.

In various embodiments, the candidacy of cellular nodes from N(j) may be used as additional variable along with variables such as Received Signal Strength Indicator (RSSI), Signal-to-Noise Ratio (SNR), etc., of cellular node(s), as measured and reported by UE via measurement reporting per 3GPP standards, in determining hand-off candidates to receive traffic offloaded from N(i). Accordingly, the dynamic coupling between changes in the throughput of wireless backhaul links (e.g., wireless backhaul links 118a-118c) and load balancing decisions in RAN 102 for associated set(s) of cellular node(s) 112a-112c can result in improved e2e utilization of network resources and/or improved QoE to mobile subscribers operating UE 110a-110j.

Consider another example use case in which the poor propagation conditions may be present for wireless backhaul link 118b (e.g., illustrated by the lightning bolt above the link), which may result in a reduction of throughput for wireless backhaul link 118b (e.g., via an ACM change, etc.) and may thereby trigger an indication of a capacity or throughput change event to be generated and communicated to RAN 102 along with other backhaul network related information including, at least in part, link utilization for wireless backhaul links 118-118c (e.g., identified using IDs for the links), new available capacities for wireless backhaul links 118a-118c, jitter and latency for the links. For the present example, it can be assumed that the available capacity for the links following the change event may be as follows: C(118c)>C(118a)>C(118b).

For the present example, upon receiving the change event indication in RAN 102 (e.g., by one or more elements, modules, servers, etc. maintaining and/or managing cellular nodes within RAN 102) a determination can be made that utilization of wireless backhaul link 118b has increased above a certain link utilization threshold value (e.g., based on a comparison with the threshold value) thereby triggring one or more operations for RAN 102, which can include, at least in part, offloading one or more UE connected to cellular node(s) 112b to one or more neighboring cellular node(s) associated with wireless backhaul link(s) having higher available capacity (e.g., lower link utilization) than that of wireless backhaul link 118b.

For the present example, it can be assumed that cellular node(s) 112a can be identified (e.g., using stored link associations in combination with measurement reports received from one or more of UE 110c-110g connected to cellular node(s) 112c) as candidate cellular node(s) to which UE 110c can be offloaded. Similarly, it can be assumed that cellular node(s) 112c can be identified as candidate cellular node(s) to which UE 110f and UE 110g can be offloaded. As shown in FIG. 1 via the dashed line between UE 110c and cellular node(s) 112a, UE 110c can be offloaded to cellular node(s) 112a to relieve congestion in RAN 102 and/or the wireless backhaul network. Also shown in FIG. 1 via the dashed lines between each of UE 110f and UE 110g and cellular node(s) 112c, UE 110f and UE 110g can be offloaded to cellular node(s) 112c to relieve congestion in RAN 102 and/or the wireless backhaul network. It should be understood that the present particular example illustrates only one example use case for an example link condition that may be present in communication system 100. Any other link conditions for any combination of one or more link(s) and any other operations could be performed to relieve RAN and/or wireless backhaul network congestion in accordance with the scope of the teachings of the present disclosure.

In at least one embodiment, upon determining that utilization of any wireless backhaul link(s) increases beyond certain link utilization threshold value(s), one or more operations can be performed that can include, at least in part, configuring and/or re-configuring sets of cellular node(s) to relieve congestion for the sets of cellular node(s) and any associated wireless backhaul link(s). In some embodiments, the configuring/re-configuring can include, at least in part, adjusting QoS policies for certain set(s) of cellular node(s) that may receive offloaded traffic from other cellular node(s) associated other wireless backhaul link(s) having lower available capacity. In some embodiments, the adjusting can include setting QoS policies for the certain set(s) of cellular node(s) receiving the offloaded traffic to ensure that only high priority UE traffic is supported for these certain set(s) of cellular node(s).

In some embodiments, the configuring/reconfiguring can include, at least in part, enabling admission control for one or more set(s) of cellular node(s). In some embodiments, the admission control can be used to prevent new sessions from being admitted for the cellular node(s) associated with links experiencing link utilization higher than a given link utilization threshold. Further building on the example case introduced above, cellular node(s) associated with capacity C(j) (e.g., where C(j)>C(i)) can configure/reconfigure their operating parameters to enforce QoS policies locally to ensure only high priority traffic is supported during the periods of high link utilization on link L(i) and/or to enforce admission control to prevent new sessions from being admitted by cellular nodes associated with capacity C(j).

In other embodiments, it may be determined that link utilization may decrease below link utilization threshold value(s) for one or more wireless backhaul link(s) 118a-118c. Upon determining that link utilization has decreased below certain link utilization threshold value(s) for one or more wireless backhaul link(s) 118a-118c, one or more operations can be performed to adjust loading among one or more wireless backhaul link(s) to more evenly distribute the loading for RAN 102 and wireless backhaul links 118a-118c thereby optimizing e2e utilization of the network. In some embodiments, upon determining that utilization for a certain wireless backhaul link has decreased below a certain link utilization threshold, the operations can include resetting QoS policies for certain cellular node(s) that may have previously received offloaded UE from one or more other cellular node(s) when traffic is re-balanced within RAN 102. In some embodiments, upon determining that utilization for a certain wireless backhaul link has decreased below a certain link utilization threshold, the operations can include updating the admission control for certain cellular node(s) that offloaded traffic to allow new sessions to be admitted to the cellular node(s).

In some embodiments, a SON algorithm can be configured to facilitate one or more operations to adjust cellular loading for RAN 102 via a centralized SON (cSON) architecture using a centralized SON server and/or a distributed SON (dSON) architecture using distributed SON servers. For example, in some embodiments, a SON algorithm for a SON server (centralized or distributed) can be configured to use backhaul network related information such as, for example, the available capacity and/or utilization for each wireless link 118a-118c associated with each of the sets of cellular node(s) 112a-112c and any link association information pertaining thereto, in order to; to assess loading between sets of cellular node(s) 112a-112c in relation to the available capacity and/or utilization of corresponding wireless backhaul links 118a-118c; and/or to trigger one or more operations to adjust cellular loading for RAN 102.

More generally, building on the example case introduced above, for embodiments in which a centralized SON architecture is implemented, a centralized SON server can perform the selection of cellular node(s) N(j) having C(j)>C(i) and can negotiate handover to such nodes node(s) for various UE connected to cellular node(s) N(i). For embodiments in which a distributed SON architecture is implemented, individual cellular node(s) associated with capacity C(i) of link L(i) can negotiate handover with cellular node(s) associated with capacity C(j).

Operations to adjust cellular loading in RAN 102 can also implemented using other elements, nodes or systems within RAN 102. In some embodiments, a RAN management system (RMS) can be configured to facilitate one or more operations to adjust cellular loading in RAN 102 either alone or in combination with a SON sever.

Embodiments of the present disclosure are not limited only to receiving change event indications and/or backhaul network information from the backhaul network. In some embodiments, RAN related information can be communicated from RAN 102 to the backhaul network in which a backhaul network management system may use the information to manage wireless backhaul nodes 114.1a-114.2a, 114.1b-114.2b and/or 114.1c-114.2c. In various embodiments, the information communicated from RAN 102 to the backhaul network can include X2/S1 loading information, cellular node configuration information for set(s) of cellular node(s) 112a-112c, a number of UEs connected to set(s) of cellular node(s) 112a-112c and/or application flow information (e.g., types of applications/services being utilized by UE 110a-110j within RAN 102). In various embodiments, RAN related information received from RAN 102 can be used to manage routing decisions between hops of the backhaul network (e.g., based on backhaul network topology).

Thus, communication system 100 can provide a system and method to perform one or more operations to relieve congestion in RAN 102 during period(s) of low throughput for one or more respective wireless backhaul links 118a-118c associated with sets of one or more cellular node(s) 112a-112c, respectively. In various embodiments, one or more advantages can be provided by communication system 100 over current deployments. For example, current deployments only take RAN state into consideration when adjusting loading with the RAN; there is no awareness of conditions for other parts of the network. For wireless backhaul links, ACM is an established technique to adjust link throughput, but dynamic changes in throughput in the backhaul network are not explicitly communicated or used in any other part of the network for current deployments. In contrast, the method provided by communication system 100 may provide for combining information related to changes in wireless backhaul throughput with RAN optimization algorithm(s) to improve end-to-end network utilization.

Other advantages can be provided in various embodiments. In particular, some vendors and/or equipment manufacturers may offer products for both RAN deployments and backhaul deployments. Service providers that may implement their mobile networks using the products capable of facilitating operations described herein may be able to utilize their network more efficiently, which can result in lower opex. Such service providers may also be less conservative in over-provisioning backhaul, thereby saving equipment capex. Because of improved network utilization across RAN and backhaul network deployments, the method provided by communication system 100 may, in various embodiments, give service providers the flexibility to upgrade their network in steps, for example, they may first upgrade 3G cellular nodes to LTE cellular nodes to provide enhanced services to subscribers and then may later refresh backhaul equipment.

Figure 2A:
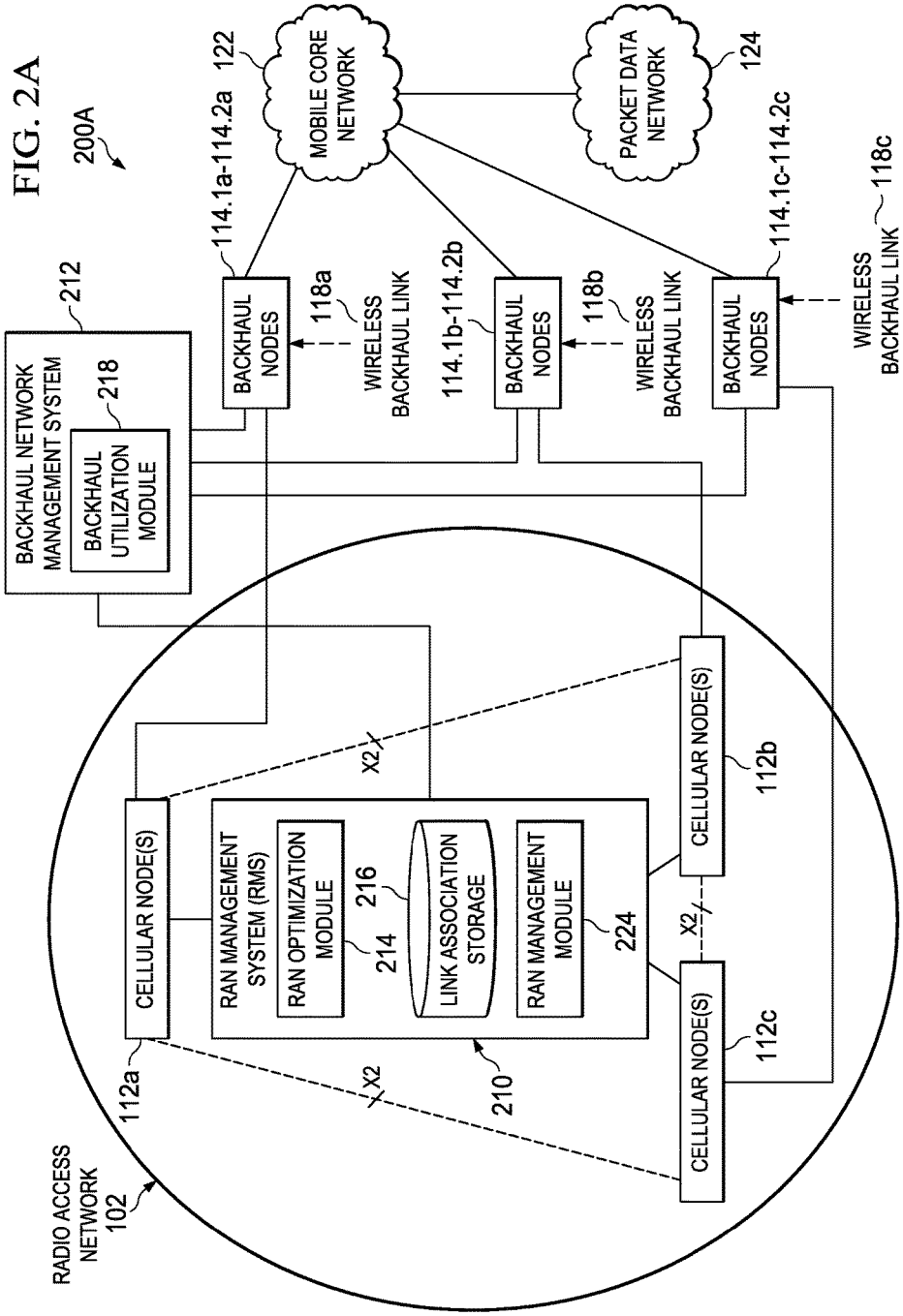
Figure 2B:
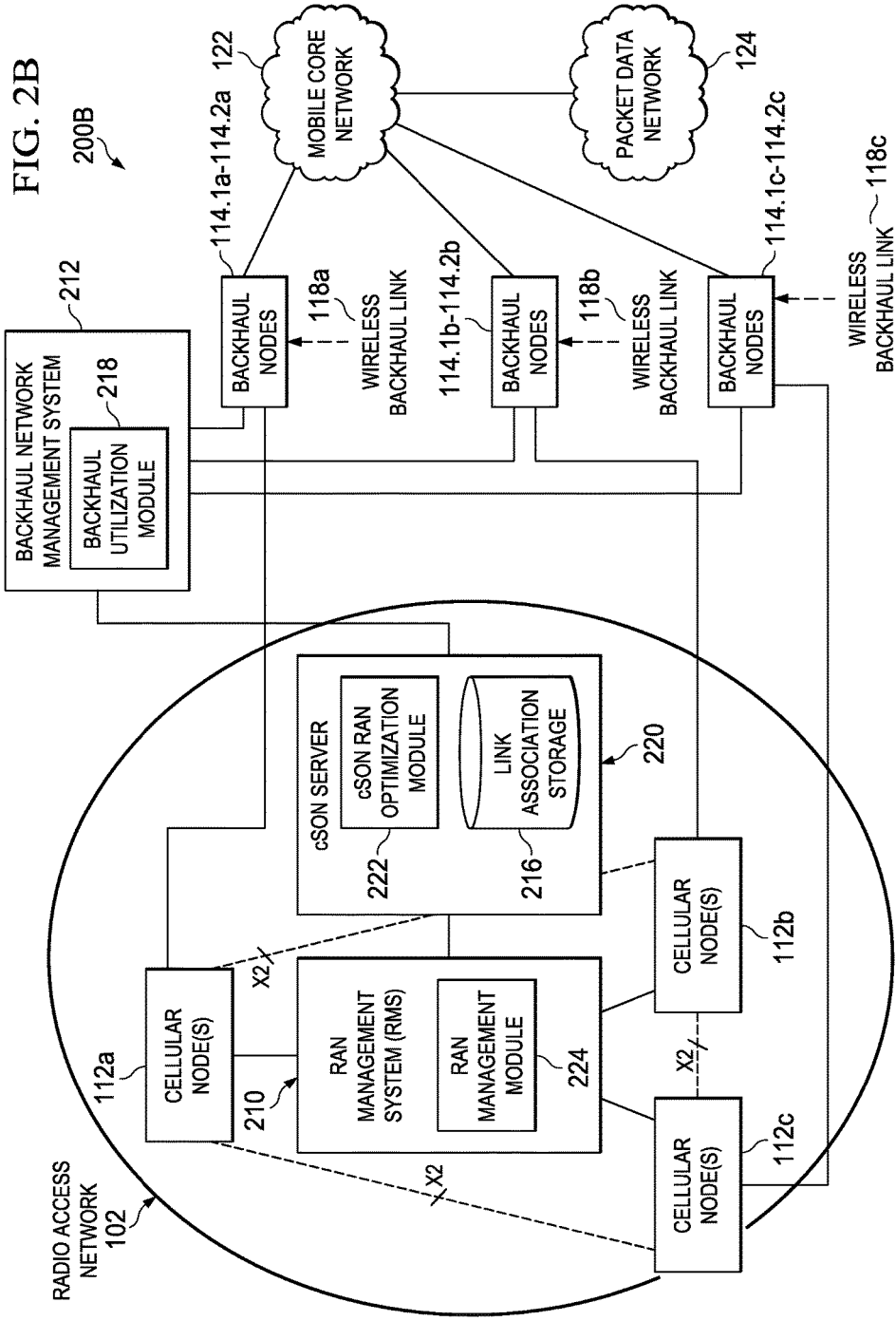

Turning to FIGS. 2A-2C, FIGS. 2A-2C are simplified block diagrams 200A-200C illustrating other details associated with various potential embodiments of communication system 100. As noted previously, the method provided by communication system 100 can be implemented using different architectures and/or techniques for handling capacity or throughput change event indications communicated to RAN 102. In various embodiments, the method can be provided through direct configuration of sets of cellular node(s) 112a-112c, using radio and/or backhaul management systems, using dSON algorithms, using cSON algorithms, combinations thereof or the like. Accordingly, FIGS. 2A-2C illustrate different architectures, which can be used in various embodiments, to facilitate the method provided by communication system 100 to adjust cellular loading in RAN 102 to manage network utilization.

Referring to FIG. 2A, FIG. 2A is a simplified block diagram 200A illustrating various example details for at least one example architecture that can be associated with communication system 100, which can facilitate one or more operations to adjust cellular loading for RAN 102 in accordance with one potential embodiment. FIG. 2A includes sets of cellular node(s) 112a-112c. Sets of cellular node(s) 112a-112c can each interface with a RAN Management System (RMS) 210, which can include a RAN optimization module 214, a RAN management module and a link association storage 216. RMS 210 can further interface with a backhaul Network Management System (NMS) 212, which can include a backhaul utilization module 218. Backhaul NMS 212 can further interface with each of: backhaul nodes 114.1a-114.2a (associated with wireless backhaul link 118a), backhaul nodes 114.1b-114.2b (associated with wireless backhaul link 118b) and backhaul nodes 114.1c-114.2c (associated with wireless backhaul link 118c). Backhaul nodes 114.1a-114.2a, 114.1b-114.2b and 114.1c-114.2c can each further interface with mobile core network 122 and packet data network (PDN) 124. In some embodiments, for 4G/LTE deployments, sets of cellular node(s) 112a-112c can be interconnected via corresponding X2 interfaces within RAN 102.

In various embodiments, RMS 210 can be configured, via RAN management module 224, to facilitate interface, control and/or management capabilities between RMS 210 and cellular node(s) 112a-112c. In various embodiments, RMS can be configured, via RAN optimization module 214, to facilitate the optimization of RAN resources (e.g., cellular node(s) 112a-112c) via one or more of: interfacing with backhaul NMS 212; determining and/or facilitating one or more cellular loading adjustment operations for RAN 102 upon receiving indication(s) of capacity or throughput change event(s), which can be generated by backhaul NMS 212 for capacity or throughput change event(s) for any of respective wireless backhaul links 118a-118c associated with backhaul nodes 114.1a-114.2a, 114.1b-114.2b and 114.1c-114.2c, respectively; combinations thereof or other optimization operations for RAN 102. In various embodiments, link association storage 216 can be configured to store information indicating a corresponding link association for each of the respective sets of cellular node(s) 112a-112c and the respective wireless backhaul links 118a-118c through which data for each of the respective sets of cellular node(s) 112a-112c can flow.

In various embodiments, backhaul NMS 212, via backhaul utilization module 218, can monitor, manage and/or update backhaul nodes 114.1a-114.2a, 114.1b-114.2b and 114.1c-114.2c(e.g., via ACM adjustments, antenna adjustments, etc.) for the backhaul network. For example, during operation, backhaul NMS 212 can adjust the capacity for wireless backhaul links 118a-118c through ACM operations in response to various operating conditions, loads, etc. that may occur for each link.

In various embodiments, backhaul NMS 212, via backhaul utilization module 218, can generate an indication (e.g., a message, packet, etc.) of capacity or throughput change event(s) for changes in capacity or throughput for one or more wireless backhaul link(s) 118a-118c and may communicate the indication along with any other information as discussed herein to RMS 210 for one or more capacity or throughput changes that may occur for one or more of wireless backhaul links 118a-118c. In various embodiments, the capacity or throughput change event message(s) for any corresponding capacity or throughput change event(s) can include, at least in part, an indication of the link utilization(s) for one or more wireless backhaul link(s) 118a-118c, new available capacity or throughput for one or more wireless backhaul link(s) 118a-118c (including an ID for each link and associated new available capacity) and/or other backhaul network related information as discussed herein.

In various embodiments, receiving an indication of capacity or throughput change event(s) for one or more of wireless backhaul link(s) 118a-118c can trigger RMS 210 to compare, via RAN optimization module 214, the utilization for wireless backhaul link(s) 118a-118c with one or more threshold utilization values configured for the wireless backhaul links 118a-118c. Based on the comparisons, the link utilization values received for wireless backhaul links 118a-118c from backhaul NMS 212 and/or the link associations for the links, RMS 210, via RAN optimization module 214 and/or RAN management module 224, may perform one or more operations to adjust cellular loading for RAN 102 as discussed for various embodiments described herein.

In various embodiments, different mechanisms, protocols, and/or interfaces to facilitate communications between backhaul NMS 212 and respective backhaul nodes 114.1a-114.2a, 114.1b-114.2b and 114.1c-114.2c for information associated with each link 118a-118c, respectively, can be configured. In various embodiments, these mechanisms, protocols and/or interfaces can include, but not be limited to customized event managers and/or Simple Network Management Protocol (SNMP).

Referring to FIG. 2B, FIG. 2B is a simplified block diagram 200B illustrating various example details for at least one other example architecture that can be associated with communication system 100, which can facilitate one or more operations to adjust cellular loading for RAN 102 in accordance with one potential embodiment. In particular, FIG. 2B includes a centralized SON (cSON) server 220, which can be included in RAN 102. In various embodiments, cSON server 220 can include a cSON RAN optimization module 222. In various embodiments, link association storage 216 can be included in cSON server 220. In some embodiments, link association storage 216 can be stored across both cSON server 220 and RMS 210. RMS 210 can include RAN management module 224, which can be configured to provide interface, control and management capabilities between RMS 210, cellular node(s) 112a-112c and cSON server 220. Additionally, backhaul NMS 212 can include backhaul utilization module 218.

In various embodiments, cSON server 220 can be configured via cSON RAN optimization module 222 to implement one or more cSON algorithms, which can be enhanced with functionality to perform the method described herein through one or more operations including: interfacing with backhaul NMS 212; determining and/or facilitating one or more cellular loading adjustment operation(s) for RAN 102 upon receiving an indication of a capacity or throughput change for one or more of wireless backhaul link(s) 118a-118c; combinations thereof or other operations to optimize utilization of network resource for RAN 102. In various embodiments, link association storage 216 can be configured similar to that as described for FIG. 2A.

During operation in at least one embodiment, cSON server 220 may receive an indication of capacity or throughput change event(s) from backhaul NMS 212 through one or more change event message(s) that may be generated by backhaul NMS 212 (e.g., via backhaul utilization module 218). In various embodiments, the indication can include an indication of the link utilization(s) for one or more wireless backhaul link(s) 118a-118c, new available capacity or throughput for one or more wireless backhaul link(s) 118a-118c and/or other backhaul network related information as discussed herein.

In various embodiments, receiving the indication of the capacity or throughput change event(s) may trigger cSON server 220, via cSON RAN optimization module 222, to compare the utilization for wireless backhaul link(s) 118a-118c with one or more threshold utilization values configured for the wireless backhaul links 118a-118c. Based on the comparison, the link utilization values received for wireless backhaul links 118a-118c from backhaul NMS 212 and/or the link associations for the links, cSON server 220, via cSON RAN optimization module 222, can interface with RMS 210 to perform, via RAN management module 224, one or more operations to adjust cellular loading for RAN 102 as discussed for various embodiments described herein. In some embodiments, a cSON server (e.g., cSON server 220) may have access to information for RAN 102 such as, for example, information related to parallel networks (e.g., 3G/4G, macro cell networks, small cell networks, non-3GPP networks (e.g., WiFi, WiMAX)) which may provide the cSON server with a global view of the state of the RAN. In various embodiments, such global information can be used by the cSON server to further enhance operations that may be provided to adjust cellular loading for RAN 102.

Referring to FIG. 2C, FIG. 2C is a simplified block diagram 200C illustrating various example details for at least one other example architecture that can be associated with communication system 100, which can facilitate one or more operations to adjust cellular loading for RAN 102 in accordance with one potential embodiment. In particular, FIG. 2C includes distributed SON (dSON) RAN optimization modules for each cellular node within RAN 110. For example, in at least one embodiment, the first set of one or more cellular node(s) 112a can each include respective dSON RAN optimization module(s) 230a and respective link association storage(s) 216a; the second set of one or more cellular node(s) 112b can each include respective dSON RAN optimization 230b and respective link association storage(s) 216b; and the third set of one or more cellular node(s) 112c can each include respective dSON RAN optimization 230c and respective link association storage(s) 216c. Additionally, RMS 210 can include RAN management module 224 and backhaul NMS 212 can include backhaul utilization module 218. In various embodiments, respective link association storage(s) 216a-216c for respective sets of cellular node(s) can be configured to store information similar to that as described above for link association storage 216.

During operation in at least one embodiment, RMS 210 may receive an indication of capacity or throughput change event(s) from backhaul NMS 212 through one or more change event message(s) that may be generated by backhaul NMS 212 (e.g., via backhaul utilization module 218). Upon receiving one or more change event indication(s), RMS 210, via RAN management module 224, can forward the indication(s) and any other associated information (e.g., link utilization, capacity, throughput, etc.) to each set of cellular node(s) 112a-112c. Via respective dSON RAN optimization module(s) 230a-230c, each of the sets of one or more respective cellular node(s) 112a-112c can perform utilization comparisons and may use link utilization information (e.g., received via the change event indication(s), and link associations stored in respective link association storage(s) 216a-216c in order to communicate between cellular node(s) 112a-112c to perform one or more operations to adjust cellular loading for RAN 102. For example, in some embodiments, say, for example, for a 4G/LTE deployment, respective cellular node(s) 112a-112c, via respective dSON RAN optimization module(s) 230a-230c, can directly negotiate handovers among each other via the X2 interface to move UE from wireless backhaul links experiencing high link utilization to wireless backhaul links having lower link utilization to mitigate congestion for RAN 102. In some embodiments, respective cellular node(s) 112a-112c, via respective dSON RAN optimization module(s) 230a-230c, may communicate via a proprietary interface or via RMS 210 to perform cellular loading adjustment operations for RAN 102.

Turning to FIG. 3, FIG. 3 is a simplified flow diagram illustrating example operations 300 associated with managing network utilization according to wireless backhaul and radio access network (RAN) conditions to provide optimal end-to-end (e2e) network resource utilization in accordance with one potential embodiment of communication system 100. In various embodiments, operations 300 can be performed using one or more of: RMS 210 including RAN optimization module 214 or RAN management module 224, cSON algorithms (e.g., implemented via cSON server 220 including cSON RAN optimization module 222, and/or dSON algorithms (e.g., implemented via dSON RAN optimization module(s) 230a-230c for RAN 102 and/or backhaul Network Management System (NMS) 212 via backhaul utilization module 218.

In various embodiments one or more link association storage(s) can be configured for RMS 210, cSON server 220, one or more sets of cellular node(s) 112a-112c and/or mobile core network 122 to maintain an association for sets of cellular node(s) 112a-112c corresponding wireless backhaul link(s) 118a-118c. In some embodiments, prior to perform the operations associated with managing network utilization, operations 300 can include configuring at 302, link associations for each of set of cellular node(s) 112a-112c and wireless backhaul links 118a-118c.

At any time operating conditions for wireless backhaul links (e.g., wireless backhaul links 118a-118c) can change (e.g., due to weather, environmental conditions, equipment malfunctions, etc.), which can cause congestion for RAN 102 and/or for the wireless backhaul links. Accordingly, operations associated with managing network utilization can begin at 304 in which a backhaul network management system (e.g., backhaul NMS 212) can monitor wireless backhaul links 118a-118c associated with RAN 102. At 306, the operations can include receiving an indication of a change in operating conditions for one or more wireless backhaul links. In various embodiments, the indication of the change in operating conditions can be an indication of a capacity or throughput change event (e.g., an ACM adjustment, traffic change, carrier aggregation, antenna modulation, etc.) for the one or more wireless backhaul links and can include one or more of: a link utilization for one or more wireless backhaul links, a new available capacity for one or more wireless backhaul link, jitter, latency, combinations thereof or other backhaul network related information. In various embodiments depending on the architecture of communication system 100, the indication of the change in operating conditions can be received, for example, by one or more of: RMS 210, cSON server 220 and/or dSON RAN optimization module(s) 230a-230c.

At 308, the operations can include determining utilization of one or more wireless backhaul link(s) in comparison to one or more link utilization threshold value(s) configured for the link(s). For example, in various embodiments, the operations can include determining that link utilization for one or more wireless backhaul link(s) has increased above certain link utilization threshold value(s) or determining link utilization has decreased below certain (same or different) link utilization threshold value(s). In some embodiments, backhaul NMS 212 may track historical capacity or throughput conditions for wireless backhaul links 118a-118c in order to generate information to be included in capacity or throughput change event messaging (e.g., an indication noting a change from high to low throughput rate or vice-versa). In some embodiments, one or more of RMS 210, cSON server 220 and/or dSON RAN optimization module(s) 230a-230c may track historical conditions capacity or throughput conditions for wireless backhaul links 118a-118c.

At 310, the operations can include assessing an available capacity for each wireless backhaul link 118a-118c following any capacity or throughput change(s) for any wireless backhaul link(s). In various embodiments, the available capacity for each wireless backhaul link 118a-118c can be determined by calculating the difference between the throughput rate for each respective link at a given point in time and the sum of traffic flowing through each respective link from any corresponding cellular node(s) associated with each respective link. In some embodiments, the available capacity for each wireless backhaul link 118a-118c can be included in any messaging indicating capacity or throughput change event(s).

At 312, the operations can include adjusting cellular loading in RAN 102 based, at least in part on the utilization of wireless backhaul links 118a-118c and the available capacity of the wireless backhaul links 118a-118c and the operations may end. In at least one embodiment, a relationship of available capacities for each wireless backhaul link 118a-118c can be determined in order to determine which link(s) may have higher throughput in relation to other link(s) following certain capacity or throughput change event(s). In some embodiments, the relationship of available capacities can be used in one or more mitigation operations that can be performed to reduce congestion for RAN 102 and/or the backhaul network.

As provided in the various embodiments described herein, operations to adjust cellular loading for RAN 102 can include, but not be limited to, one or more of: offloading UE from overloaded cellular node(s) associated with link(s) experiencing increased link utilization above a certain link utilization threshold to other cellular node(s) having lighter load(s), and/or associated with link(s) capable of higher throughput (e.g., using various link associations configured for the system) and/or having lower link utilization; re-configuring cellular node(s) (e.g., changing QoS policies, admission control, etc.); re-distributing UE loads between cellular node(s) (e.g., upon determining that link utilization for one or more wireless backhaul link(s) has improved and/or decreased below a certain threshold); or any other operations described herein in this Specification, combinations or extensions thereof or the like.

Turning to FIG. 4, FIG. 4 is a simplified flow diagram illustrating other example operations 400 associated with managing network utilization that can be performed in accordance with one potential embodiment of communication system 100. In particular, operations 400 can be associated with RAN 102 cellular loading adjustments in which one or more UE can be offloaded (e.g., via handover) from cellular node(s) associated with a wireless backhaul link having higher link utilization (e.g., having lower available capacity) to one or more neighboring cellular node(s) associated with corresponding wireless backhaul link(s) having lower link utilization (e.g., having higher available capacity). In various embodiments, operations 400 can be performed using one or more of: RMS 210 including RAN optimization module 214 or RAN management module 224, cSON algorithms (e.g., implemented via cSON server 220 including cSON RAN optimization module 222, and/or dSON algorithms (e.g., implemented via dSON RAN optimization module(s) 230a-230c for RAN 102 and/or backhaul Network Management System (NMS) 212 via backhaul utilization module 218.

At any time operating conditions for wireless backhaul links (e.g., wireless backhaul links 118a-118c) can change (e.g., due to weather conditions, environmental conditions, equipment malfunctions, cellular traffic in the RAN, etc.), which can cause congestion for RAN 102 and/or for the wireless backhaul links. In certain embodiments, operations 400 may assume that a capacity or throughput change event has been received for at least one wireless backhaul link (e.g., wireless backhaul link 118b associated with cellular node(s) 112b); that a determination has been made that link utilization for the at least one wireless backhaul link (e.g., wireless backhaul link 118b) has increased above a particular link utilization threshold configured for the link (e.g., available capacity has decreased); and that available link capacities for all wireless backhaul links (e.g., wireless backhaul links 118a-118c) have been determined (e.g., determined via backhaul NMS 212 and communicated to RAN 102). Operations 400 may also assume that link associations have been configured and stored in one or more elements of communication system 100.

Accordingly, at 402, based on a determination that link utilization for the at least one wireless backhaul link (e.g., link 118b) has increased above the particular link utilization threshold, the operations can include identifying one or more other wireless backhaul link(s) (e.g., link 118a and/or link 118c) having higher available capacity than the at least one wireless backhaul link having decreased available capacity (e.g., experiencing the increased link utilization). In some embodiments, operations 402 can include comparing available capacities for wireless backhaul links to determine available capacity relationships among the links (e.g., to develop a rank order of available capacities among the wireless backhaul links).

At 404, the operations can include identifying one or more candidate cellular node(s) (e.g., cellular node(s) 112a and/or 112c) associated with the other wireless backhaul link(s) (e.g., link 118a and/or link 118c) having higher available capacity (e.g., lower link utilization) to receive handover over of one or more UE from the cellular node(s) (e.g., cellular node(s) 112b) associated with the at least one wireless backhaul link (e.g., wireless backhaul link 118b) having the decreased available capacity.

In some embodiments, one or more cellular node(s) can be identified as candidate cellular node(s) for handover based on their association, determined via stored link association information, to wireless backhaul link(s) having higher available capacity and that are determined to be neighboring cellular node(s) of the cellular node(s) associated with the at least one wireless backhaul link (e.g., wireless backhaul link 118b) experiencing the decreased available capacity/increased link utilization. In some embodiments, cellular node(s) can be identified as candidate cellular node(s) for handover using measurement reports received from UE connected to the cellular node(s) associated with the at least one wireless backhaul link experiencing decreased available capacity/increased link utilization in combination with the capacity comparisons between links and the stored link associations. In some embodiments, candidate cellular node(s) can be determined using stored link associations in combination the available capacity comparisons and automatic neighbor relation (ANR) techniques, which can be used to identify neighboring cellular node(s) of the cellular node(s) associated with the at least one wireless backhaul link experiencing decreased available capacity/increased link utilization.

At 406, the operations can include offloading one or more UE connected to the cellular node(s) associated with the at least one wireless backhaul link having decreased available capacity (e.g., cellular node(s) 112b associated with wireless backhaul link 118b) to the identified one or more of the candidate cellular node(s) (e.g., cellular node(s) 112a and/or 112c) in RAN 102 associated with the other wireless backhaul link(s) (e.g., link(s) 118a and/or 118c) having higher available capacity and the operations may end. In some embodiments, the operations can further include, at 408, reconfiguring QoS policies for the candidate cellular node(s) receiving the offloaded UE to allow only high priority traffic to traverse the candidate cellular node(s). In some embodiments, the operations can further include, at 410, reconfiguring admission control for the cellular node(s) associated with the wireless backhaul link(s) having decreased available capacity to deny any other UE from connecting to the cellular node(s).

It should be understood that operations 400 as described with respect to cellular node(s) 112b and wireless link(s) 118b can be applied to any combination of one or more wireless backhaul link(s) 118a-118c and associated cellular node(s) 112a-112c.

Turning to FIG. 5, FIG. 5 is a simplified flow diagram illustrating other example operations 500 associated with managing network utilization that can be performed in accordance with one potential embodiment of communication system 100. In particular, operations 500 can be associated with RAN 102 cellular loading adjustments in which loading for cellular node(s) (e.g., cellular node(s) 112a-112c) can be adjusted, balanced, etc. via handover of UE between neighboring cellular node(s) upon receiving an indication of lowered or decreased link utilization (e.g., increased available capacity) for one or more wireless backhaul link(s) 118a-118c. In various embodiments, operations 500 can be performed using one or more of: RMS 210 including RAN optimization module 214 or RAN management module 224, cSON algorithms (e.g., implemented via cSON server 220 including cSON RAN optimization module 222, and/or dSON algorithms (e.g., implemented via dSON RAN optimization module(s) 230a-230c for RAN 102 and/or backhaul Network Management System (NMS) 212 via backhaul utilization module 218.

At any time operating conditions for wireless backhaul links (e.g., wireless backhaul links 118a-118c) can change (e.g., due to weather conditions, environmental conditions, equipment malfunctions, cellular traffic in the RAN, etc.). In certain embodiments, operations 500 may assume that a capacity or throughput change event has been received for at least one wireless backhaul link (e.g., wireless backhaul link 118c associated with cellular node(s) 112c); that a determination has been made that link utilization for at least one wireless backhaul link (e.g., wireless backhaul link 118b) has decreased below a particular link utilization threshold (e.g., available capacity has increased); and that available capacities for all wireless backhaul links (e.g., wireless backhaul links 118a-118c) have been determined (e.g., determined via backhaul NMS 212 and communicated to RAN 102). Operations 500 may also assume that link associations have been configured and stored in one or more elements of communication system 100.

Accordingly, at 502, based on a determination that link utilization for the at least one wireless backhaul link (e.g., wireless backhaul link 118b) has decreased below the particular link utilization threshold, the operations can include identifying one or more other wireless backhaul link(s) (e.g., link 118a and/or 118c) having lower available capacity (e.g., higher link utilization) than wireless backhaul link 118b having the increased available capacity (e.g., experiencing the decreased link utilization). In some embodiments, the identifying at 502 can include comparing available capacities for wireless backhaul links to determine capacity relationships among the links (e.g., to develop a rank order of available capacities among the wireless backhaul links).

At 504, the operations can include identifying candidate cellular node(s) (e.g., cellular node(s) 112b) associated with the at least one wireless backhaul link (e.g., wireless backhaul link 118b) having increased available capacity (e.g., decreased link utilization) for handover of one or more UE to the cellular node(s). In some embodiments, one or more cellular node(s) can be identified as candidate cellular node(s) for handover based on their association, determined via stored link association information, to wireless backhaul link(s) having higher available capacity that are determined to be neighboring cellular node(s) of the wireless backhaul link(s) experiencing the decreased available capacity. In some embodiments, cellular node(s) can be identified as candidate cellular node(s) for handover using measurement reports received from UE that are connected to the cellular node(s) associated with the wireless backhaul link(s) experiencing the decreased available capacity in combination with the capacity comparisons between links and the stored link associations. In some embodiments, candidate cellular node(s) can be determined using stored link associations in combination with capacity comparisons and automatic ANR techniques.

At 506, the operations can include offloading one or more UE connected to the cellular node(s) (e.g., cellular node(s) 112a and/or 112c) associated with the wireless backhaul link(s) (e.g., link(s) 118a and/or 118c) having lower available capacity (e.g., higher link utilization) to one or more of the identified candidate cellular node(s) associated with the at least one wireless backhaul link having increased available capacity (e.g., cellular node(s) 112b associated with wireless backhaul link 118b) and the operations may end. In some embodiments, the operations can further include, at 508, reconfiguring QoS policies for the cellular node(s) from which the UE were offloaded, for example, to reset any QoS policies that may have been set to limit UE traffic traversing the cellular node(s) to only high priority traffic. In some embodiments, the operations can further include, at 510, reconfiguring admission control for the cellular node(s) associated with the at least one wireless backhaul link having increased available capacity to allow UE to connect to those cellular node(s) if, for example, admission control had previously been set for the cellular node(s) to prevent UE from connecting thereto.

It should be understood that operations 500 as described with respect to cellular node(s) 112b and wireless link(s) 118b can be applied to any combination of one or more wireless backhaul link(s) 118a-118c and associated cellular node(s) 112a-112c.

Turning to FIGS. 6A-6D, FIGS. 6A-6D are simplified block diagrams illustrating example details of various elements that can be associated with communication system 100 in accordance with one or more embodiments.

Figure 6A:
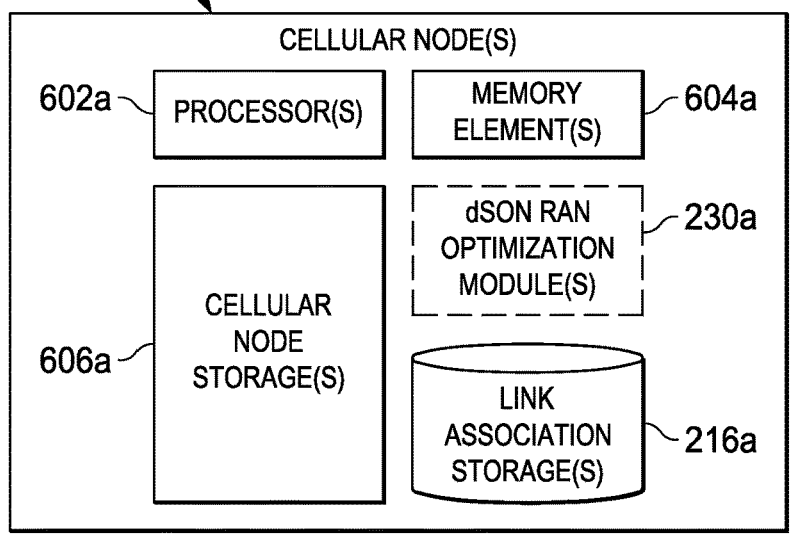
FIGS. 6A-6D are simplified block diagrams illustrating additional details associated with various potential embodiments of the communication system.

Referring to FIG. 6A, FIG. 6A is a simplified block diagram illustrating example details that can be associated with cellular node(s) 112a for a given set of cellular node(s) in accordance with one potential embodiment of communication system 100. Note, although FIG. 6A is described with reference to cellular node(s) 112a, it should be understood that the example details described for cellular node(s) 112a can be configured for any sets of cellular node(s) (e.g., cellular node(s) 112b and/or 112c) for communication system 100. FIG. 6A includes cellular node(s) 112a, which, in one or more embodiments, can include at least one respective processor(s) 602a, at least one respective memory element(s) 604a and a respective cellular node storage(s) 606a. In some embodiments, depending, for example, on the architecture of communication system 100, cellular node(s) 112a can include dSON RAN optimization module(s) 230a and link association storage(s) 216a. In at least one embodiment, at least one processor(s) 602 is at least one hardware processor(s) configured to execute various operations and/or functions of cellular node(s) 112a and/or dSON RAN optimization module(s) 230a, as described herein and at least one memory element(s) 604 can store data associated with cellular node(s) 112a and/or dSON RAN optimization module(s) 230a.

In various embodiments, dSON RAN optimization module(s) 230a can be configured to facilitate determining the utilization for one or more wireless backhaul link(s) 118a-118c in comparison to one or more link utilization threshold value(s); determining and/or facilitating one or more operations associated with adjusting cellular loading in RAN 102; interfacing with RMS 210; combinations thereof or any other operations as described herein for cellular node(s) 112a. In various embodiments, cellular node storage(s) 606 can be configured to store information associated with various operations as described herein. In various embodiments, link association storage(s) 216a can be configured to store information related to associations between any sets of cellular node(s) that may be deployed in communication system 100 and any corresponding wireless backhaul links through which UE data for the cellular node(s) may be communicated.

Figure 6B:
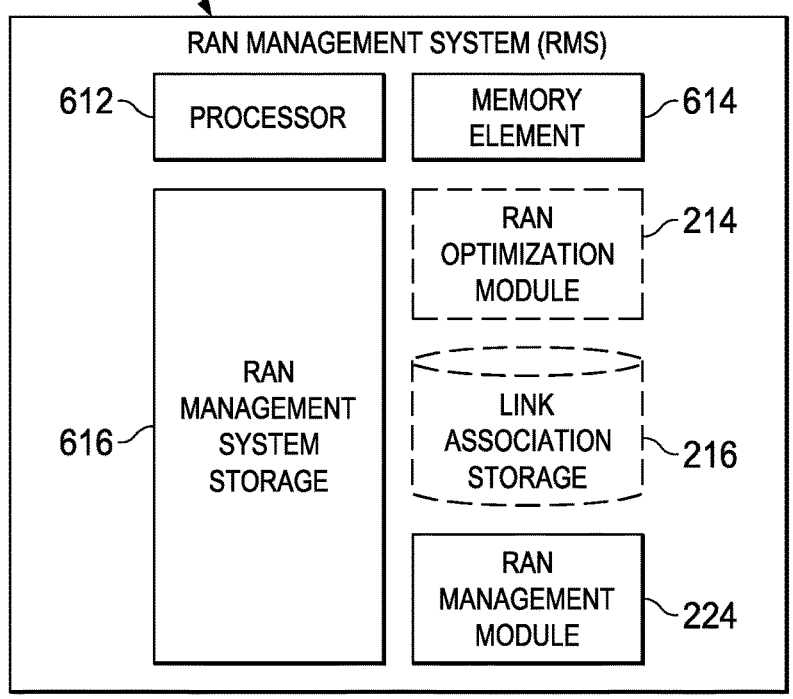

Referring to FIG. 6B, FIG. 6B is a simplified block diagram illustrating example details that can be associated with RAN Management System (RMS) 210 in accordance with one potential embodiment of communication system 100. FIG. 6B includes RMS 210, which, in one or more embodiments, can include at least one processor 612, at least one memory element 614, a RAN Management System (RMS) storage 616 and RAN management module 224. In some embodiments, depending on the architecture of communication system 100, RMS 210 can include link association storage 216. In some embodiments, depending on the architecture of communication system 100, RMS 210 can include RAN optimization module 214. In at least one embodiment, at least one processor 612 is at least one hardware processor configured to execute various operations and/or functions of RMS 210, RAN management module 224 and/or RAN optimization module 214, as described herein and at least one memory element(s) 614 can store data associated with RMS 210, RAN management module 224 and/or RAN optimization module 214.

In various embodiments, RAN management module 224 can be configured to facilitate interface, control and/or management capabilities between RMS 210 and cellular node(s) 112a-112c and/or backhaul NMS 212 either alone or in combination with RAN optimization module 214 or any other RAN optimization element or module that may be present in communication system 100. In various embodiments, RAN optimization module 214 can be configured to facilitate interfacing with backhaul NMS 212, determining the utilization for one or more wireless backhaul link(s) 118a-118c in comparison to one or more link utilization threshold value(s); determining and/or facilitating one or more operations associated with adjusting cellular loading in RAN 102; combinations thereof or any other operations as described herein for RMS 210. In various embodiments, RMS storage 616 can be configured to store information associated with various operations as described herein. In various embodiments, link association storage 216 can be configured to store information related to associations between any sets of cellular node(s) that may be deployed in communication system 100 and any corresponding wireless backhaul links through which UE data for the cellular node(s) may be communicated.

Figure 6C:
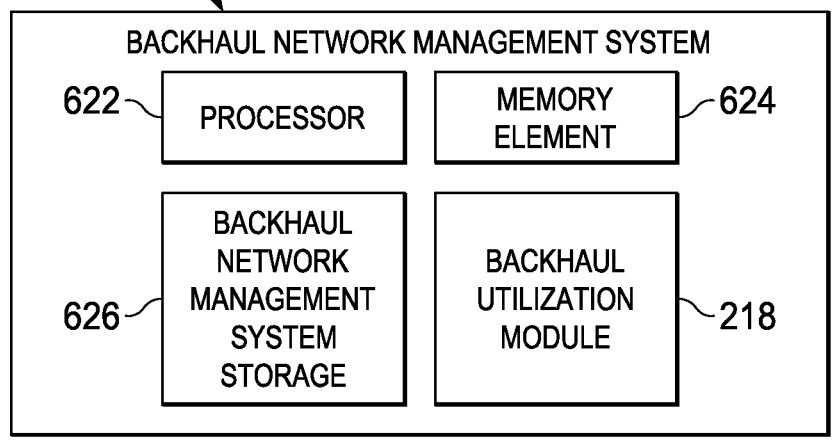

Referring to FIG. 6C, FIG. 6C is a simplified block diagram illustrating example details that can be associated with Backhaul Network Management system 212 in accordance with one potential embodiment of communication system 100. FIG. 6C includes Backhaul Network Management system 212, which, in one or more embodiments, can include at least one processor 622, at least one memory element 624, a backhaul network management system storage 626 and backhaul utilization module 218. In at least one embodiment, at least one processor 622 is at least one hardware processor configured to execute various operations and/or functions of backhaul Network Management System 212 and/or backhaul utilization module 218, as described herein and at least one memory element(s) 624 can store data associated with backhaul Network Management System 212 and/or backhaul utilization module 218.

In various embodiments, backhaul utilization module 218 can be configured to facilitate one or more of: monitoring, managing and/or updating backhaul nodes 114.1a-114.2a, 114.1b-114.2b and 114.1c-114.2c (e.g., via ACM adjustments, antenna adjustments, etc.); generating one or more throughput or capacity change event indications including any other backhaul network related information that may be communicated to RAN 102 (e.g., RMS 210, cSON server 220, etc.); combinations thereof or any other operations as described herein for backhaul Network Management System 212. In various embodiments, backhaul network management system storage 626 can be configured to store information associated with various operations as described herein.

Figure 6D:
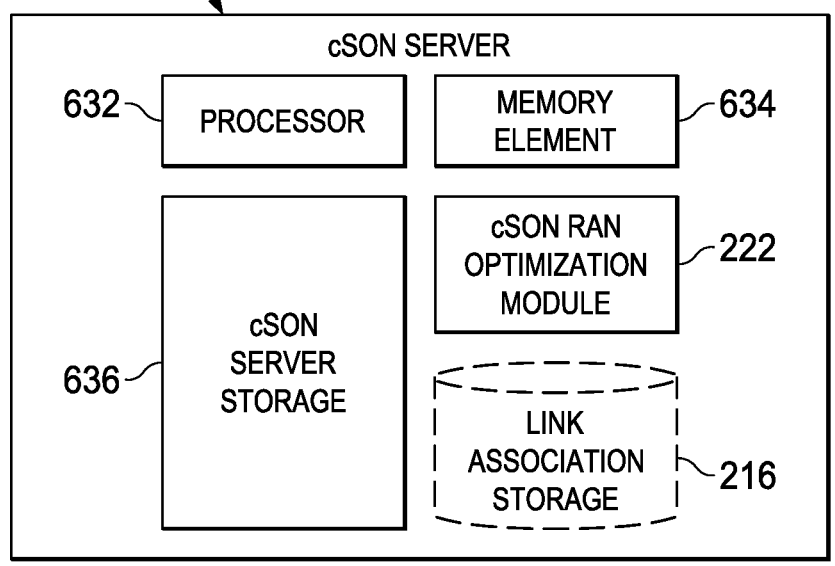

Referring to FIG. 6D, FIG. 6D is a simplified block diagram illustrating example details that can be associated with cSON server 220 in accordance with one potential embodiment of communication system 100. FIG. 6D includes cSON server 220, which, in one or more embodiments, can include at least one processor 632, at least one memory element 634, a cSON server storage 636, cSON RAN optimization module 222 and link association storage 216. In at least one embodiment, at least one processor 632 is at least one hardware processor configured to execute various operations and/or functions of cSON server 220 and/or cSON RAN optimization module 222, as described herein and at least one memory element 634 can store data associated with cSON server 220 and/or cSON RAN optimization module 222.

In various embodiments, cSON RAN optimization module 222 can be configured to facilitate one or more of: interfacing with backhaul NMS 212; determining the utilization for one or more wireless backhaul link(s) 118a-118c in comparison to one or more link utilization threshold value(s) upon receiving an indication of a capacity or throughput change for one or more of wireless backhaul link(s) 118a-118c; determining and/or facilitating one or more operations associated with adjusting cellular loading in RAN 102; combinations thereof or other operations as described herein for cSON server 220. In various embodiments, cSON server storage 636 can be configured to store information associated with various operations as described herein. In various embodiments, link association storage 216 can be configured to store information related to link associations between any sets of cellular node(s) that may be deployed in communication system 100 and any corresponding wireless backhaul links through which UE data for the cellular node(s) may be communicated.

In regards to the internal structure associated with communication system 100, each of UE 110a-110j, other sets of cellular node(s) 112b, 112c and backhaul nodes 114.1a-114.2a, 114.1b-114.2b, 114.1c-114.2c may each also include a respective at least one processor, a respective at least one memory element and/or a respective storage. Hence, appropriate software, hardware and/or algorithms are being provisioned in UE 110a-110j, sets of one or more cellular node(s) 112a-112c, RMS 210, backhaul Network Management System 212, backhaul nodes 114.1a-114.2a, 114.1b-114.2b, 114.1c-114.2c and/or cSON server 220, depending on configuration, in order to facilitate managing network utilization according to wireless backhaul network and RAN 102 conditions. Note that in certain examples, certain databases (e.g., for storing information associated with operations described herein) can be consolidated with memory elements (or vice versa), or the storage can overlap/exist in any other suitable manner.

In one example implementation, UE 110a-110j, sets of one or more cellular node(s) 112a-112c, RMS 210, backhaul Network Management System 212, backhaul nodes 114.1a-114.2a, 114.1b-114.2b, 114.1c-114.2c and/or cSON server 220, depending on configuration, are network elements, which are meant to encompass network appliances, servers, routers, switches, gateways, bridges, loadbalancers, firewalls, processors, modules, or any other suitable device, component, element, or object, which may be operable to exchange information that facilitates or otherwise helps to manage network utilization according to wireless backhaul network and RAN 102 conditions (e.g., for networks such as those illustrated in FIGS. 1 and 2A-2C). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 110a-110j, sets of one or more cellular node(s) 112a-112c, RMS 210, backhaul Network Management System 212, backhaul nodes 114.1a-114.2a, 114.1b-114.2b, 114.1c-114.2c and/or cSON server 220, depending on configuration, may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 110a-110j, sets of one or more cellular node(s) 112a-112c, RMS 210, backhaul Network Management System 212, backhaul nodes 114.1a-114.2a, 114.1b-114.2b, 114.1c-114.2c and/or cSON server 220, depending on configuration, could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the functions as outlined herein associated with managing network utilization according to wireless backhaul network and RAN 102 conditions may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 6A-6D] can store data used for the operations described herein. This includes the memory elements being able to store software, logic, code, or processor instructions that are executed to carry out the activities described herein. A processor can execute any type of instructions associated with the data to achieve the operations detailed herein. In one example, a processor can include multiple processing cores, each capable of performing operations in a parallel or serial manner to carry out activities described herein. In another example, the processors [as shown in FIGS. 6A-6D] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'certain embodiment', 'an embodiment', 'another embodiment', 'some embodiments', 'various embodiments', 'other embodiments', 'certain embodiments', 'alternative embodiment', and the like are intended to mean that any such features are included in one or more embodiments of the present disclosure, but may or may not necessarily be combined in the same embodiments. Note also that a module as used herein in this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate various processes, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
configuring link associations between a plurality of cellular nodes and a plurality of wireless backhaul links, wherein each of the plurality of cellular nodes is linked to one of the plurality of wireless backhaul links;
monitoring a plurality of wireless backhaul links associated with a radio access network (RAN);
receiving an indication of a change in operating conditions for a first wireless backhaul link of the plurality of wireless backhaul links;
determining utilization of the first wireless backhaul link based on the indication of the change in operating conditions;
calculating an available capacity of each of the plurality of wireless backhaul links based on a difference between throughput of each particular wireless backhaul link and a summation of UE traffic to be communicated through each wireless backhaul link; and
adjusting cellular loading in the RAN by handing over user equipments (UEs) connected to a first cellular node associatively linked to the first wireless backhaul link to a second cellular node of the plurality of cellular nodes associatively linked to a second wireless backhaul link, wherein handing over the UEs is performed in response to determining that a utilization of the second wireless backhaul link is less than a utilization of the first wireless backhaul link.

2. The method of claim 1, wherein the indication of the change in operating conditions is associated with a throughput or capacity change event resulting in a change in the utilization of the first wireless backhaul link.

3. The method of claim 2, wherein the indication of the change in operating conditions includes an indication of utilization of each of the plurality of wireless backhaul links.

4. The method of claim 1, wherein the link associations identify a relationship between each particular wireless backhaul link and one or more of the plurality of cellular nodes for which UE traffic is communicated; and
storing the link associations in at least one memory element.

5. The method of claim 1, further comprising:
communicating the indication of the change in operating conditions for the first wireless backhaul link to one or more of:
a RAN management system;
a central self-organizing network (cSON) server associated with the RAN; and
one or more distributed self-organizing network (dSON) modules associated with the RAN, wherein each dSON management system is further associated with a set of one or more of the plurality of cellular nodes associated with a particular wireless backhaul link of the plurality of wireless backhaul links.

6. The method of claim 1, wherein determining the utilization of the first wireless backhaul link includes determining that the utilization is above a particular link utilization threshold for the first wireless backhaul link and wherein adjusting cellular loading in the RAN further by handing over UEs comprises:
identifying the second wireless backhaul link as having higher available capacity than the first wireless backhaul link;
identifying candidate cellular nodes of the plurality of cellular nodes in the RAN associated with the second wireless backhaul link, wherein the candidate cellular nodes neighbor the first cellular node and include a different cellular node, wherein the candidate cellular nodes comprises the second cellular node; and
offloading one or more UEs connected to the first cellular node to the second cellular node in the RAN associated with the second wireless backhaul link.

7. The method of claim 1, further comprising:
reconfiguring quality of service (QoS) policies for the second cellular node in response to handing over the UEs to the second cellular node.

8. The method of claim 1, further comprising:
reconfiguring, in response to handing over the UEs to the second cellular node, admission control for the first cellular node to deny any other UE from connecting to the first cellular node.

9. One or more non-transitory tangible media encoding logic that includes instructions for execution that when executed by a processor, is operable to perform operations comprising:
configuring link associations between a plurality of cellular nodes and a plurality of wireless backhaul links, wherein each of the plurality of cellular nodes is linked to one of the plurality of wireless backhaul links;
monitoring a plurality of wireless backhaul links associated with a radio access network (RAN);
calculating an available capacity of each of the plurality of wireless backhaul links based on a difference between throughput of each particular wireless backhaul link and a summation of UE traffic to be communicated through each wireless backhaul link;

receiving an indication of a change in operating conditions for a first wireless backhaul link of the plurality of wireless backhaul links;

determining utilization of the first wireless backhaul link based on the indication of the change in operating conditions;

assessing an available capacity of each of the plurality of wireless backhaul links; and adjusting cellular loading in the RAN by handing over UEs connected to a first cellular node associatively linked to the first wireless backhaul link to a second cellular node of the plurality of cellular nodes associatively linked to a second wireless backhaul link, wherein handing over the UEs is performed in response to determining that a utilization of the second wireless backhaul link is less than a utilization of the first wireless backhaul link.

10. The media of claim 9, wherein the indication of the change in operating conditions is associated with a throughput or capacity change event resulting in a change in a link utilization of the first wireless backhaul link.

11. The media of claim 10, wherein the indication of the change in operating conditions includes an indication of a link utilization of each of the plurality of wireless backhaul links.

12. The media of claim 9, the operations further comprising:

communicating the indication of the change in operating conditions for the first wireless backhaul link to one or more of:
 a RAN management system;
 a central self-organizing network (cSON) server associated with the RAN; and
 one or more distributed self-organizing network (dSON) modules associated with the RAN, wherein each dSON management system is further associated with a set of one or more cellular nodes of the plurality of cellular nodes associated with a particular wireless backhaul link of the plurality of wireless backhaul links.

13. The media of claim 9, wherein determining the utilization of the first wireless backhaul link includes determining that the utilization is above a particular link utilization threshold for the first wireless backhaul link and wherein adjusting cellular loading in the RAN by handing over UEs further comprises:

identifying the second wireless backhaul link as having higher available capacity than the first wireless backhaul link;

identifying candidate cellular nodes of the plurality of cellular nodes in the RAN associated with the second wireless backhaul link, wherein the candidate cellular nodes neighbor the first cellular node and include a different cellular node, wherein the candidate cellular nodes comprises the second cellular node; and offloading one or more UEs connected to the first cellular node to the second cellular node in the RAN associated with the second wireless backhaul link.

14. The media of claim 9, wherein the operations further comprise:

reconfiguring quality of service (QoS) policies for the second cellular node in response to handing over the UEs to the second cellular node.

15. The media of claim 9, wherein the operations further comprise:

reconfiguring, in response to handing over the UEs to the second cellular node, admission control for the first cellular node to deny any other UE from connecting to the first cellular node.

16. A communication system comprising:

at least one memory element for storing data; and at least one processor that executes instructions associated with the data, wherein the at least one processor and the at least one memory element cooperate such that the communication system is configured for:

configuring link associations between a plurality of cellular nodes and a plurality of wireless backhaul links, wherein each of the plurality of cellular nodes is linked to one of the plurality of wireless backhaul links;

monitoring a plurality of wireless backhaul links associated with a radio access network (RAN);

calculating an available capacity of each of the plurality of wireless backhaul links based on a difference between throughput of each particular wireless backhaul link and a summation of UE traffic to be communicated through each wireless backhaul link;

receiving an indication of a change in operating conditions for a first wireless backhaul link of the plurality of wireless backhaul links;

determining utilization of the first wireless backhaul link based on the indication of the change in operating conditions;

assessing an available capacity of each of the plurality of wireless backhaul links; and adjusting cellular loading in the RAN by handing over UEs connected to a first cellular node associatively linked to the first wireless backhaul link to a second cellular node of the plurality of cellular nodes associatively linked to a second wireless backhaul link, wherein handing over the UEs is performed in response to determining that a utilization of the second wireless backhaul link is less than a utilization of the first wireless backhaul link.

17. The communication system of claim 16, wherein the indication of the change in operating conditions is associated with a throughput or capacity change event resulting in a change in link utilization of the first wireless backhaul link.

18. The communication system of claim 16, wherein the indication of the change in operating conditions includes an indication of a link utilization of each of the plurality of wireless backhaul links.

19. The communication system of claim 16, wherein the communication system is further configured for:

communicating the indication of the change in operating conditions for the first wireless backhaul link to one or more of:
 a RAN management system;
 a central self-organizing network (cSON) server associated with the RAN; and
 one or more distributed self-organizing network (dSON) modules associated with the RAN, wherein each dSON management system is further associated with a set of one or more cellular nodes of the plurality of cellular nodes associated with a particular wireless backhaul link of the plurality of wireless backhaul links.

20. The communication system of claim 16, wherein the communication system is configured for:

reconfiguring, in response to handing over the UEs to the second cellular node, admission control for the first cellular node to deny any other UE from connecting to the first cellular node.

\* \* \* \* \*